(12) United States Patent
Shaver

(10) Patent No.: US 8,750,781 B2
(45) Date of Patent: *Jun. 10, 2014

(54) METHOD OF STUDENT COURSE AND SPACE SCHEDULING

(76) Inventor: Tom Shaver, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,375

(22) Filed: May 8, 2010

(65) Prior Publication Data

US 2011/0202184 A1 Aug. 18, 2011

Related U.S. Application Data

(63) Continuation of application No. 11/124,751, filed on May 9, 2005, now Pat. No. 7,805,107.

(60) Provisional application No. 60/629,149, filed on Nov. 18, 2004.

(51) Int. Cl.
  *G09B 3/00*  (2006.01)
  *G06Q 40/00*  (2012.01)
  *G05B 19/418*  (2006.01)
  *G06F 9/46*  (2006.01)

(52) U.S. Cl.
  USPC .................................. 434/350; 705/5; 705/8

(58) Field of Classification Search
  USPC ......................................... 434/322, 323, 350
  See application file for complete search history.

(56) References Cited

U.S. PATENT DOCUMENTS

| | | | |
|---|---|---|---|
| 6,643,493 B2* | 11/2003 | Kilgore | 434/350 |
| 6,988,138 B1* | 1/2006 | Alcorn et al. | 709/225 |
| 6,988,239 B2* | 1/2006 | Womble et al. | 715/205 |
| 2004/0110119 A1* | 6/2004 | Riconda et al. | 434/350 |
| 2004/0161728 A1* | 8/2004 | Benevento et al. | 434/118 |
| 2006/0105315 A1* | 5/2006 | Shaver | 434/362 |
| 2006/0252021 A1* | 11/2006 | Watkins et al. | 434/350 |

* cited by examiner

*Primary Examiner* — Kesha Frisby
(74) *Attorney, Agent, or Firm* — Polsinelli PC

(57) ABSTRACT

A method is provided of using a specifically purposed computer for associating the timing of academic course offerings to the parking limitations and needs that are presented by the selected buildings being used for designated academic activities and a method is provided of using a specifically purposed computer for the correlating of course offering scheduling with determined to be appropriate teaching space availability for a particular academic period and a method of using a specifically purposed computer system to minimize heating and cooling load requirements related to the offering of academic related activities also is provided.

3 Claims, 6 Drawing Sheets

US 8,750,781 B2

METHOD OF STUDENT COURSE AND SPACE SCHEDULING

CROSS REFERENCE

This application is a continuation application of U.S. patent application Ser. No. 11/124,751, filed May 9, 2005, now issued as U.S. Pat. No. 7,805,107 issued Sep. 28, 2010, which claimed priority under 35 U.S.C. 119(e) and 37 C.F.R. 1.78(4) based upon then copending U.S. Provisional Application Ser. No. 60/629,149 filed Nov. 18, 2004.

BACKGROUND OF THE INVENTION

Academic schedule development is a process in which every institution of higher education engages to some degree. While technology has been used to automate and improve many business processes in higher education, the process of developing academic schedules has not changed much during the past several years. The primary reasons for this inertia are the complexity and political volatility of schedule creation as well as an aversion to running an institution of higher education like a business.

The room assignment component of academic schedule building has long been acknowledged by mathematicians to be a hard (or NP-complete) problem. NP-complete optimization problems are sufficiently complex that it is not possible to prove one optimal solution. Michael W. Carter and Craig G. Tovey released a study in 1991 entitled *When is the Classroom Assignment Problem Hard?* In which they prove that all but the most simplistic approach to room assignment is NP-complete. Adding to the complexity is the fact that room assignment is only one of the NP-complete problems that make up the entire schedule building process. Meeting time and faculty assignment are also complex, NP-complete optimization problems. The fact that each of these complex components is related to, and constrains, the others makes the academic schedule creation process quite daunting.

Academic departments typically exert significant pressure on the academic schedule development process. "Turf" battles over control of space and prime teaching times are common. Pressure to allow senior faculty to dictate what they teach, when they teach and where they teach is usually high. These political limitations have made it difficult to implement student and efficiency oriented changes to scheduling practices.

Despite their considerable operating budgets, institutions of higher education do not like to be thought of as businesses. An assumed conflict between business and learning motivations appears to be the reason for this phenomenon. Budgetary pressures and competition from for-profit technical schools have only recently forced many institutions to think and act more like businesses.

Academic schedule development includes the following key steps: course offering management, faculty assignment, meeting time assignment, and room assignment.

Course offering management is the first step in academic schedule development. During this step, an institution seeks to determine a) what courses to teach, and b) how many sections of those courses (Course Sections) to offer. These determinations rely on the institution's understanding of student demand for the various courses in their curriculum, which heretofore has been very limited. Demand Analysis, when practiced in higher education, has been limited to studying populations of students who have taken courses in past academic terms. This approach, called Historical Analysis, has been applied to overall demand and subsets of the scheduling week—like Morning, Evening, Weekend—or academic term type—like Fall, Spring, Summer. Institutions with Lock Step curriculum track the size of each group that starts a fixed program of study each academic term. The size of this group, less attrition each term, is the basis for determinations of what to teach and how many Course Sections to offer. Neither approach features the student-specific needs analysis which is the key to significant scheduling process improvements.

Faculty Assignment is the process of matching available faculty members with Course Sections in a timetable. This is typically a highly decentralized process where the academic departments assign their available faculty to the Course Sections that are being offered. Like course offering management, there has been no significant process improvement in this area of academic schedule development.

Meeting time assignment is the process of placing Course Sections into time and day slots. These slots are typically standardized by an institution so that the majority of Course Sections use the standard meeting patterns (e.g., 8:00 AM-8:50 AM MWF might be a standard meeting pattern for three contact hour Course Sections that meet on Monday/Wednesday/Friday). Time assignments can be a decentralized (done by academic departments) or a centralized process (done by a central scheduling office). Time assignments attempt to cluster activities in popular (primetime) time slots while spreading assignments out enough to eliminate room and known student conflicts. Room conflicts occur when there are more activities needing a particular group of rooms during a time slot than there are rooms in that group. In manual and automated systems (commercial or homegrown), this type of room scarcity is only discovered after the scheduling process is materially complete and certain activities can not be placed. To eliminate student conflicts, an institution relies on its ability to predict the groups of Course Sections that students will need for an upcoming term so that they can attempt to keep those Course Sections conflict free (and the students can register for those Course Sections). There has been significant progress in commercial software that can automate this assignment process. There has, however, been no progress in the process by which institutions predict which Course Sections must be conflict free for an upcoming term. The best practice has been to study historical patterns at a macro (course) level to discern what courses students might take in the same term. This approach is ineffective in determining potential conflicts between Course Sections, which is the heart of the time assignment problem. This problem is related to the limitation in the process described as Demand Analysis in the course offering management section, above, and it applies to both the Roll Forward and Lock Step approach. Institutions using a Lock Step curriculum have a similar limitation. While it is easy to know which Course Sections a cohort is supposed to take, it is very difficult to track and account for students who deviate from their prescribed schedules. These institutions have an increasingly higher percentage of students who can fall off the prescribed schedules because of transfer credits, failed courses, and an unexpected change in their time of day availability forcing them to take a part-time load.

Room assignment is process of placing Course Sections into rooms. This can be a decentralized (done by academic departments) or a centralized process (done by a central scheduling office). The objective of this step in the schedule development process is typically to assign rooms that will be satisfactory to the faculty and have an appropriate capacity. Assignments must always be made so as to avoid double booking a Course Section with another Course Section or event.

DESCRIPTION OF THE PRIOR ART

There are a small number of vendors who have developed commercial software applications to address the academic scheduling problem, most notably: CollegeNet (formerly Universal Algorithms based in Portland, Oreg.), Scientia (based in Cambridge, U.K.), CCM Software (based in Dublin, Ireland), Infosilem (based in Montreal, Quebec), and Ad Astra Information Systems (the applicant, based in Kansas City, Mo.). All of these vendors market popular room scheduling tools that provide significant assistance to institutions that are willing to define room attributes and assignment rules and priorities for those rooms.

Some of the firms listed above—notably, Scientia, CCM Software, Infosilem and Ad Astra Information Systems—have developed timetabling tools that feature automated assignment algorithms for meeting times and rooms. In addition to finding a meeting time and room for course sections, timetabling systems attempt to eliminate known conflicts for instructors and students.

With the exception of the present invention, there have been no significant development efforts—commercially or by individual institutions—in the academic schedule development areas of course offering management or faculty assignment. Institutional research departments are common, and technology has allowed these entities to develop more attractive reports with less effort. However, the basic information derived from this analysis is the same as it has been from years—what types of students have enrolled at the institution and what they have taken in the past. While this is valuable information, it does little to tell institutions about the course needs of existing students in their declared areas of study. A further limitation is the fact that Historical Analysis can only tell an institution what students settled for from the finite course availability in the academic schedules in which they registered for courses. It is impossible to tell if the five courses that a student selected are their first choices, or if they wanted to take other courses that were not available. Availability, therefore, significantly distorts any analysis of student demand for courses. Finally, there have been no significant developments in the application of Demand Analysis to govern changes in a Master Schedule.

There are no commercial systems available to assist institutions in making changes to their course offerings based on analysis, and the data typically includes hundreds or thousands of discrepancies between the recommended offerings and the Roll Forward schedule. Without a way to prioritize those discrepancies, academic departments would be asked to abandon the cultural scheduling practices that are common on most campuses and submit to an unacceptable number of changes to the Master Schedule. Simply put, institutions need a system that will allow them to discern the content (how many Course Sections to offer) and time changes that will be most directly benefit students' progress to their degrees. Such a system might distill one hundred content and time changes out of a recommended two thousand possible changes in a Master Schedule of a medium-sized institution (containing approximately three thousand Course Sections).

In the 70's some ambitious institutions experimented with an alternative approach to scheduling, the Demand Driven Approach. This approach features a schedule that is built after students select the courses that they need. The advantage of the Demand Driven Approach is that the supply-demand dilemma of is inherently resolved in that Timetable development is based on the actual course demand. Unfortunately, this approach is fraught with practical limitations. A student who has selected a course must be "sectioned" into a given Course Section by the institution without the student's input. Since students have less control over their schedules, they tend to be less satisfied with the result—leading to a high level of changes (add-drop) that ruin an "optimal" schedule. Most colleges and universities (and all popular North American enterprise software systems) have responded to these limitations by adopting the Master Schedule Approach.

Another approach, the Lock Step approach, has been used by many technical colleges. This approach typically features a guaranteed graduation path, provided that the student agrees to completely follow a fixed schedule that the institution dictates. Therefore, Lock Step institutions suffer from being limited to creating schedules for those students that can stay on the prescribed schedule. Since fewer students follow that path today than ever—because of changes in student time of day availability due to work schedules or other commitments, a desire to take a part-time load, or the possibility of failing a course in the degree path—schedule building can only benefit a shrinking portion of their enrollment (often less than 50% of the overall student population).

The Master Schedule Approach conforms to the way most colleges and universities do business and all popular enterprise software systems support the registration process. The limitation of the Master Schedule Approach, as stated above, is that there is little to no good Demand Analysis data to assist in academic schedule development. This deficiency impacts both key components of Demand Analysis addressed below: Quantitative Demand and Joint Demand Analysis. Without better information on demand, Timetable changes can not be based on an adequate understanding of student needs.

While not directly applicable to the academic schedule development process, several vendors have released systems designed to track individual student degree progress. These systems, commonly called Degree Audit, also help institutions evaluate the degree status of individual students. These systems are primarily rules engines wherein an institution configures the often complex degree fulfillment rules of its various programs of study. Typically, these systems have advanced reporting capabilities to output an "audit" on a student for that student or his/her advisor. Prominent vendors include DARS (owned by Miami University of Ohio and based on its Oxford, Ohio campus), Decision Academic Graphics (based in Ottawa, Ontario), and several prominent enterprise solution providers like SCT Sunguard (based in Malvern, Pa.), Datatel (based in Fairfax, Va.), PeopleSoft (based in California), and Jenzabar (based in Cambridge, Mass.). These systems are limited in their ability to predict student demand for two primary reasons: Audits are designed to be individual student reports (not demand data ready to be aggregated across the student population), and there is limited forward-looking information on recommended or standard course sequencing (a student may have ten courses may be remaining in a degree, but the system doesn't know what that student should take in the upcoming term—first semester of their Junior year). More advanced systems now include a "course cart" capability wherein a student may select desired courses for future academic terms. None of these systems, however support the following processes recommended in this application: student availability by time and day, modeling needs against tentative Course Sections in future academic terms, and (most significantly) the aggregation and application of the data from these course carts as a demand analysis exercise that might refine proposed Master Schedule or Lock Step course offerings.

There has been no significant development in the area of academic schedule development designed to minimize energy use. Commonly, institutions schedule rooms so as to maximize space utilization. The focus of space utilization is typically to match the maximum enrollment (course capacity) of a Course Section with the seating capacity of a potential room. This approach is valid when space is at a premium (e.g., during "primetime" hours). It is not valid when space is not at a premium (e.g., non-primetime hours and/or a low enrollment term like a Summer term). When space is not at a premium, it is more important to concentrate scheduling into a finite number of HVAC Zones and contiguous time slots within those zones. No academic scheduling systems, heretofore, have recognized this paradigm shift and responded by attempted to pack HVAC Zones.

There has been no significant development in the area of academic schedule development designed to consider parking availability and/or cost. Commonly, timetabling systems assume available parking when making time and room assignments. Today, with growing enrollments and an increasing number of commuter students and non-academic events at many campuses, available parking is no longer a given.

There has been no significant development in the area of academic schedule development designed to proactively identify space and time bottlenecks before attempting to schedule activities. Timetabling systems assume sufficient space when making time and room assignments. Typically, a small subset of an institution's academic activities requires bottleneck resources—rooms wherein there is full utilization during prime scheduling times. Bottleneck resources are the key to facilitating enrollment growth; in that either a portion these activities must be moved to create room for growth or additional bottleneck type rooms need to be brought on line through renovation or new construction. In the Master Schedule Approach, bottleneck activities occur during popular meeting time slots that are part of the Roll Forward schedule. In the Lock Step model, these activities require a bottleneck room during a range of time slots insufficient to allow all of the activities to be placed. If bottleneck activities are not identified before the scheduling process is started, a subset of those activities will arbitrarily remain unscheduled and have to be moved into an undesirable time slot or room.

There has been little significant development in the area of integration of scheduling systems to enterprise-wide "host" systems at institutions of higher education. These systems (often called Student Information Systems, or abbreviated to SIS) are the master system of record for Timetable development that supports student registration in Course Sections. The common approach for years is for the scheduling system to have a database and a user interface that is totally distinct from the SIS. The primary problems with this approach are data integrity and process flow.

The former issue results from the inescapable difficulties in synchronizing data in the SIS and the scheduling system when both systems allow active editing of the data. There is no way to completely eliminate this problem. The only way to minimize it is to increase the frequency of the bi-directional updates and optimize the speed by which those updates are posted. In any event, this is an unavoidable problem that compromises the quality of the integrated solution.

The latter problem results from those involved in the schedule building process needing to toggle between the two systems to complete required schedule building and time/room assignment tasks. Users would prefer that advanced scheduling tools were part of the SIS, thus eliminating the need to learn and use two systems.

SUMMARY OF THE INVENTION

The five primary components of the invention are Student-Specific Demand Analysis, Application of Demand Data, HVAC Zone-Aware Timetable Optimization, Parking-Aware Timetable Optimization and ERP Integration.

The process of developing student specific demand data to allow more informed academic schedule development is an object of the present invention. The resulting forms of student-specific Demand Analysis—Student-Specific Historical Analysis, Program Analysis and Student Survey/Modeling—feature the integration of detailed information about each active student and the aggregation of the Demand Analysis for each of these students. This information allows a much richer view of student demand than has ever been available in the prevalent Master Schedule Approach to academic schedule development. The three forms of analysis have different primary benefits.

Student-Specific Historical Analysis facilitates much more effective demand prediction than a simple Historical Analysis because it identifies each individual student's selections during past academic terms. This data can then be grouped by significant demographic sub-populations. For example, a first semester Junior majoring in Business Management will have different course selection tendencies than other sub-populations. Additional demographic data (such as status, gender, day/night, etc.) can be applied to further refine the sub-populations. Those skilled in the art can easily determine other useful attributes such as: age, nationality and ethnicity. As more or fewer students in the active student population fit in the subpopulations identified in previous academic terms, it can be inferred that the demand for those courses commonly selected by those sub-populations should proportionately grow or shrink. While this approach does not eliminate the distortion of demand from course availability in the schedules of previous academic terms included in the analysis, it does improve an institution's ability to respond to significant fluctuations in sub-populations and their typical course needs. Additionally, the study of Student-Specific Historical Demand can deliver information on common groupings of courses selected by students in the same academic term. Active students in the same sub-populations tend to have the same groupings of course selections (Joint Demand), and the institution can respond to this information by taking steps to reduce potential student conflicts between the Course Sections of these courses by not scheduling them at the same times.

Program Analysis evaluates each active student's degree progress against their declared program of study. All enterprise solution providers provide a place to store information on the courses a student has taken (or for which they have been given transfer credit). The information on program requirements is typically available in Degree Audit systems. The remaining, unsatisfied, course requirements and the likely order in which they will be taken form the core of the Program Analysis. This approach is not limited by the distortion of demand from course availability in prior academic terms, like Historical Demand Analysis. It only considers actual needs, and it can be performed for multiple terms into the future—mapping the projected degree paths of all active students who have declared a program of study. Courses that are absolute program requirements (there are no alternative courses that will satisfy the program requirement) are given the highest weight. Courses with alternative (substitute) courses are given a lower weight, inversely proportionate to the number of alternatives. The seniority of the student is considered in an effort to facilitate on-time graduations (Seniors have a more urgent need to have access to their remaining courses than Juniors), and problem courses (e.g., prerequisites of other requirements and courses failed in previous academic terms) are given higher weight. Finally, unlike Degree Audit systems, a student's needs are analyzed and aggregated with the needs of other active students. The result is a quantitative and qualitative assessment of course needs that can be used to develop academic schedules.

Student Survey Analysis is a rare practice wherein the institution takes the simplest approach to Demand Analysis— they ask the students want they want to take. The use of the student survey as a Demand Analysis tool has, traditionally, been limited to the Demand Driven Approach. Student Survey Analysis in this invention is the application of a Student Survey to a Master Schedule Approach. Once a student has selected desired courses for upcoming terms (ideally through a goal graduation date), an institution can assess its ability to offer those courses, conflict free, to that student. This analysis, obviously, becomes complex when the selections of many students are included. Another novel enhancement to previous scheduling practices is the addition of a graduation planner component that prompts a student to enter their desired graduation data and place all remaining program requirements tentatively into upcoming academic terms to model the feasibility of that student's goal graduation date. Additionally, a schedule modeling algorithm may be used at the end of the survey, allowing students to see the different schedule combinations available in the Roll forward schedule tentatively planned for future academic terms, and institutions to monitor Course Section (not just course) selections. These steps further refine the Demand Analysis process by adding time, day and potentially instructor preferences. With this enhancement, students can develop plans for upcoming terms and indicate intent while flagging course needs which are unmet in the tentative, Roll Forward schedule. These needs can be assessed and used as an impetus for making changes to the Roll Forward schedule.

The process of applying student-specific Demand Analysis to the Master Schedule Approach is the part of the invention that delivers the greatest benefit to institutions of higher education. During this process, an improved understanding of student needs and tendencies is applied to the academic schedule development process to improve student access to needed courses and to improve operational efficiencies. The process of Roll forward schedule refinement benefits from the most significant advantages found in the Demand Driven Approach and applies those advantages to a Master Schedule Approach. It recognizes that change is likely to be resisted by faculty, and limits suggested changes from the Roll forward schedule to Timetable "moves" that will yield the highest benefit. Lock step schedule creation applies similar benefits to those institutions that generate fixed curriculum academic schedules from scratch each academic term. Application of Demand Analysis to Lock Step schedules allows needed courses to be provided, conflict free when possible, and unneeded courses to be eliminated.

Roll forward schedule refinement includes four primary elements: quantity low, quantity high, course/time/day, and joint demand. Each of these elements considers the numbers of students impacted by course offering changes or conflicts and the qualitative significance of the impact. Quantity low infers the need to add Course Sections to one or more courses to meet projected demand. Quantity high infers the need to remove Course Sections from one or more courses to reduce costs and load on resources. Course/time/day infers the need to move one or more Course Sections to different parts of the scheduling week. Joint demand infers the degree to which two or more Course Sections that conflict with each other in the Roll forward schedule are needed and/or desired by the same students, necessitating that one or more Course Sections by moved to a different time slot. Joint demand information should be used as the primary factor in the selection of meting times for activities. Without this information, institutions are left to make these decisions largely based on the desires of the faculty assigned to the Course Sections. These four elements of the roll forward refinement process collectively help an institution deliver the right number of Course Sections at the right times. The desired result is a schedule that allows more students to graduate on time while eliminating unneeded Course Sections and reducing waste.

Lock step schedule creation is the application of student-specific Demand Analysis to the Lock Step approach. There are several benefits to this approach. First, it eliminates the limitations of the cohort, the group of students who start at the same time in a program and, in a perfect world, have the same schedule through graduation. Students that fall off of a perfect cohort schedule can not be accommodated in the schedule development approach that is based on the cohort. A student based approach verifies each student's progress against their program of study—and, therefore, discerns what each student should take next. Without this data, the system has to default to the cohort, which we know in advance only serves the shrinking group of your students that stay on a "normal" schedule throughout their careers. Secondly, as students fall off of a cohort schedule (almost always by falling behind the multiple academic term schedule prescribed as the degree the desired path), Demand Analysis using the cohort approach is increasingly inaccurate. Demand for courses in the cohort is inevitably overstated and demand for courses "behind" the cohort is understated. Additionally, it is much harder to manage general education requirements that are shared by multiple programs (cohorts). Inaccurate demand prevents administrators from maximizing efficiencies by combining low enrollment general education offerings from multiple programs offering on-line offerings as an optional delivery for these courses. Finally, accurately assessing demand early on in the scheduling process allows a scheduler to "nudge" demand from a low enrollment course to a higher enrollment course. This opportunity only becomes available by understanding the student-by-student progress and the pre and co-requisite rules within a program, potentially saving an institution a considerable amount of money.

Minimizing HVAC Zones in use and "packing" the times in which HVAC Zones are needed can greatly reduce energy usage. Since understanding of the HVAC Zones on various college and university campuses has been lacking, Timetable development has never systematically considered these issues. The approach of HVAC zone aware timetable optimization factors the following issues into Timetable development automatically: opportunity analysis, zone packing and interfacing with automated HVAC systems.

All institutions have a published schedule wherein the buildings are "open for business." Opportunity analysis determines if any buildings or HVAC zones are not needed for part of the institution's scheduling week. This is accomplished by determining the extent to which scheduling density and alternative uses of space (office hours, computer labs, etc.) impact the minimum operational hours of a building or HVAC zone within a larger building. Space that is required for Course Sections or alternative uses for the entire scheduling week must be not be considered in HVAC zone aware timetable optimization. The remaining buildings or HVAC zones are then targeted to be shut down for contiguous blocks of time within the scheduling week. Zone packing capitalizes on opportunities discovered in the opportunity analysis to reduce the overall hours that space is conditioned. The transition time needed to change the temperature in a building or HVAC zone must be considered in the packing process. Therefore, it is important to not only minimize the hours that a desired temperature must be maintained (hours that space is in use) but also the hours that space is being cooled down or heated up. If a building or HVAC zone is needed for 25% of a scheduling week, zone packing will attempt to assign times to Course Sections so that scheduling is limited to two or three days per week with minimal gaps in usage. Finally, passing updated scheduling information to automated HVAC systems allows those systems to proactively manage the temperatures in spaces used by Course Sections or scheduled non-academic events. This approach has two benefits: increased efficiency and a reduced reliance on motion detectors in schedule rooms.

Available parking is a critical concern when scheduling academic and non-academic activities on a college or university campus. The financial cost of providing adequate parking is a significant component of many new construction and renovation projects. Additionally, adequate parking is an important quality of life and safety issue for those attending classes and events and working at the institution.

Since scheduling processes and commercial software that address higher education scheduling lack an awareness of parking availability, Timetable development has never systematically considered this issue. The approach of parking aware timetable optimization factors the following issues into Timetable development automatically: parking load analysis by subset of scheduling week for academic and non-academic uses, parking inventory and scheduled building-to-parking lot relationship, constraint scheduling that places academic and non-academic activities based (in part) on available parking, and the financial analysis of rental income (stalls) and rental expenses (lots) related to the scheduling process.

Most institutions have detailed demographic information on their student body that allows them to determine, at least anecdotally, an academic parking load factor. Specifically, an institution might know that the majority (75%) of their day students live on campus and walk to class. At night, this percentage might drop to 25%. This simple analysis allows the institution to estimate that their academic parking load factor is three times greater in the evening, given a fixed number of students enrolled in day and night classes.

They should also have an idea about the parking needs of the people attending non-academic activities, and an electronic record of most non-academic activities scheduled during the day and night. Adding this information with fixed parking load by time of day for staff gives the institution a good understanding of parking load factors that they must manage.

Next, the institution must understand the number of spaces in the various parking lots and those spaces used by staff. Similarly, since expecting someone to walk 25 minutes from a parking spot to a class is unreasonable, each building that has rooms that can be scheduled should be related to one or more parking lot that can serve that building.

With this information, the timetabling (academic) and event scheduling (non-academic) processes should include parking availability as a constraint. The timetabling algorithm should automatically avoid significantly overbooking parking during peak scheduling times. The event scheduling module should avoid booking large events into time periods and buildings where parking is already full allocated.

Finally, the system should be able to analyze the financial impact of renting spaces to students or event attendees and paying for additional parking at certain times during the week. If a large event requires additional parking, the system should be able to assess the revenue from the event (including charging for parking) against the costs of the event (including the renting the additional parking).

Like parking, the availability of rooms during prime scheduling times, is a critical scheduling issue. The cost of adding and maintaining new space is considerable. The completion of new construction projects, or the renovation of existing under-utilized facilities, also requires a significant amount of time from conception to the availability of the new or modified space.

The approach of capacity bottleneck optimization factors the following issues into Timetable development automatically: enrollment growth projections and goals, bottleneck identification through scheduling load analysis by room type and time for academic activities, identification of academic activities scheduled in the bottleneck, identification of the quantity of bottleneck activities that need to be moved in order to achieve projected or desired enrollment growth, and prioritization of bottleneck activities that must be moved to a new time slot or room.

The recommended approach to expanding enrollments is an exercise in bottleneck management. Once a bottleneck is removed, enrollments can grow until another bottleneck appears. In this way, adjustments to academic schedules or room inventories for the sake of capacity management are confined to high impact changes that remove bottlenecks. If 10% of an institution's Course Sections are scheduled into a bottleneck, then the focus should be on those activities or the rooms that they need. Moving 10% of the bottleneck activities or adding 10% to the bottleneck room inventory will add 10% to the institution's effective capacity; so a 15,000 student campus can become a 16,500 student campus simply by moving 350 of its 3,500 offerings to different timeslots or adding/remodeling a few rooms.

Scheduling processes, and commercial software that address higher education scheduling, fail to identify bottlenecks proactively. Timetable development typically involves making all feasible assignments, followed by making concessions for the portion of the activities that are left unscheduled. The unscheduled activities are often those that the scheduler arbitrarily left to assign last, after the bottleneck resources were completely used.

Bottlenecks in upcoming (this academic year) and future (subsequent academic years) schedules should be studied for prior to optimization. For future terms, all institutions have systems in place to project enrollment growth. These systems can range from anecdotal (add offerings to courses that had a waiting list in the previous academic term) to systematic (non student-specific Historical Analysis). Ideally, automated processes to identify bottlenecks periodically (e.g., nightly as updated data is gathered from the Student Information System) would present a user with a current list of bottlenecks throughout the Timetable development process.

In the Master Schedule Approach, a relatively simple analysis of the Course Sections for an upcoming or future schedule should uncover over-allocated rooms during peak times. For example, there are 15 activities needing large lecture rooms with 200+ seats from 9:00 am to 10:00 am on Mondays. If there are only 10 lecture rooms that can accommodate these activities, then this is a bottleneck. Since 5 of those 15 activities must be moved to a different rime slot or a different type of room, all 15 activities must be identified and then analyzed so that the 5 Course Sections that will be required to move can be selected and made systematically.

In the Lock Step model, bottleneck activities require a room type during a range of time slots insufficient to allow all of the activities to be placed. For example, there are 65 activities (each of which run 2 hours) that need a computer lab during the weekday morning time range that spans 20 hours. There are 6 computer labs, all of which can be scheduled during that 20 hour time span. Because there are 130 hours of activity (65 activities multiplied by 2 hours each) and only 120 hours of available computer lab time (6 labs multiplied by 20 hours of lab time), 10 hours of activity (5 activities) can not be scheduled during the morning. Like the Master Schedule Approach, it is helpful to manage this problem proactively and systematically.

The recommended approach to processing bottleneck activities involves an equitable prioritization of those activities and reassigning the portion of those identified activities wherein desired space and/or time are not available. Examples of the possible criteria for these moves are: balancing allocation of bottleneck resources by department or academic subject, student and/or instructor time of day availability during alternative timeslots, alternative room availability, etc.

Data integrity and process flow are critically important in any systems that involve multiple users accessing multiple systems. The time-sensitive nature of scheduling, where a delay or error in synchronizing data can allow double-bookings of rooms instructors and/or students, makes this problem even more acute. Even the best data integration schemes that incorporate event-triggered updates between systems have potential update lag times or errors caused by network issues, differing data validation in the two systems or a variety of other reasons. The only true solution to this problem is to depart from the model of operating a scheduling system entirely on its own native data, part of which is a copy of the SIS data.

Simply put, product design that facilitates the scheduling systems performing all time-sensitive scheduling operations directly against the SIS data eliminates the data synchronization problem. Data is no longer passed between the systems and there are no longer two copies of the data.

To impact process flow issues caused by the users of the systems having to continually toggle between the host SIS and the scheduling system, scheduling functionality must be embedded into the SIS user interface. Scheduling system product design that enables the embedding of frequently used controls from the scheduling system into the SIS makes this possible. Users of the SIS, ideally, will not even know that they are accessing business logic from a remote system. They will simply have new features that will have been effectively added to their SIS.

As a general overview the present invention can included the following components:
1. Student-specific quantitative course demand analysis
 a. Student-Specific Historical Analysis
 b. Program Analysis
 c. Student Survey Analysis and Graduation Planning (applied to the Master Schedule Approach)
 d. Student Schedule modeling
2. Application of demand data
 e. Roll forward schedule refinement
  i. Quantitative course demand
   1. Quantity low
   2. Quantity high
  ii. Course/Time/Day demand
  iii. Student/Section demand—probability of each student/section pair
  iv. Joint Demand—weighted joint demand of each section/section pair
 f. Lock step schedule creation
  i. Student vs. cohort demand data
  ii. Collapsing low enrollment course sections across programs
  iii. Wheeling offering order
3. HVAC zone aware timetable optimization
 g. Opportunity analysis (scheduling density and alternative uses)
 h. Zone "packing" by financial impact
 i. Interfacing with automated HVAC systems
4. Parking aware timetable optimization
 j. Parking load analysis by subset of scheduling week for academic and non-academic uses
 k. Parking inventory and building-to-parking lot relationship
 l. Constraint scheduling
 m. Financial analysis of rental income (stalls) and rental expenses (lots)
5. Capacity bottleneck and infeasible optimization
 n. Enrollment growth projections and goals
 o. Bottleneck and infeasible identification through continuous optimization using multiple preference/requirement settings levels
 p. Identification of academic activities scheduled into bottleneck(s)
 q. Identification of the quantity of bottleneck activities that need to be moved in order to achieve projected or desired enrollment growth
 r. Prioritization of bottleneck activities that must be moved to new time slot(s) or room(s)
6. Student Information System Integration
 s. Dynamic Student Information System section data access
 t. Embeddable Graphical User Interface (GUI)

Step 2-C: The schedule is rolled forward from a previous term. This schedule includes the Course Sections complete with most instructor assignments, times and most room assignments.

Step 2-D: Roll Forward schedule is compared with results of demand analysis, and high impact content changes are made. The priority of potential changes is the established as the result of the weighted Quantity Low and Quantity High processes.

Step 2-E: Roll Forward schedule is compared with results of demand analysis, and high impact time and room changes are made. The priority of potential time changes is the established as the result of the weighted Wrong Time, Joint Demand, HVAC Zone processes and Parking availability processes. High impact room changes are made as the result of HVAC Zone, parking and/or capacity bottleneck optimization.

Step 2-F: Time changes are (optionally) made without instructor constraints. In this step, high impact changes identified in Step 2-E are made without being constrained by the time of day availability of the assigned instructor. If possible, the instructor is added after this step.

Step 2-G: Publish schedule to students. This threshold typically locks all modifications until after registration (Step 2-H).

Step 2-H: Students register for classes that they can get conflict-free.

Step 2-I: Minor changes are made to the schedule to respond to significant, last minute scheduling problems identified during registration. The entire demand analysis process of the invention (Steps 2-B through 2-E) can be repeated after registration based on actual demand (versus projected demand) so as to identify high impact changes that were not anticipated through projected demand.

Step 2-J: Data from schedule is exported to HVAC automated system so as to maximize energy savings.

Figure 3:
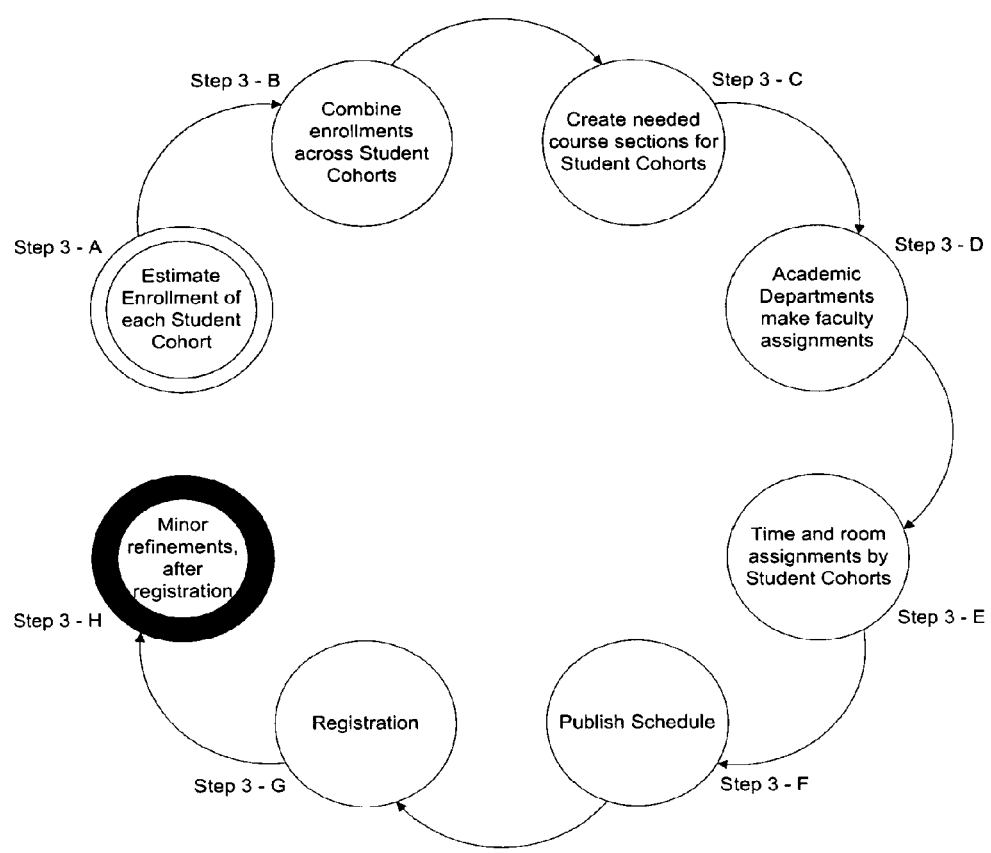

FIG. 3 shows the traditional process flow for the Lock Step schedule approach. In this process, an institution follows these steps:

Step 3-A: Estimated enrollment by student cohort. This step focuses on the number of students per cohort (program of study, time of week and starting term).

Step 3-B: Combine enrollments across student cohorts. To the extent possible, programs with common course offerings during the same part of the week collapse enrollments to reduce the number of low enrollment Course Sections.

Step 3-C: Create needed Course Sections, a result of the previous two steps.

Step 3-D: Academic Departments make faculty assignments. Traditionally, these assignments occur before time slots are assigned.

Step 3-E: Time and room assignments. These assignments are made to eliminate faculty, room and cohort conflicts.

Step 3-F: Publish schedule to students.

Step 3-G: Students register for classes that they can get conflict-free.

Step 3-H: Minor changes are made to the schedule to respond to significant, last minute scheduling problems identified during registration.

Figure 4:
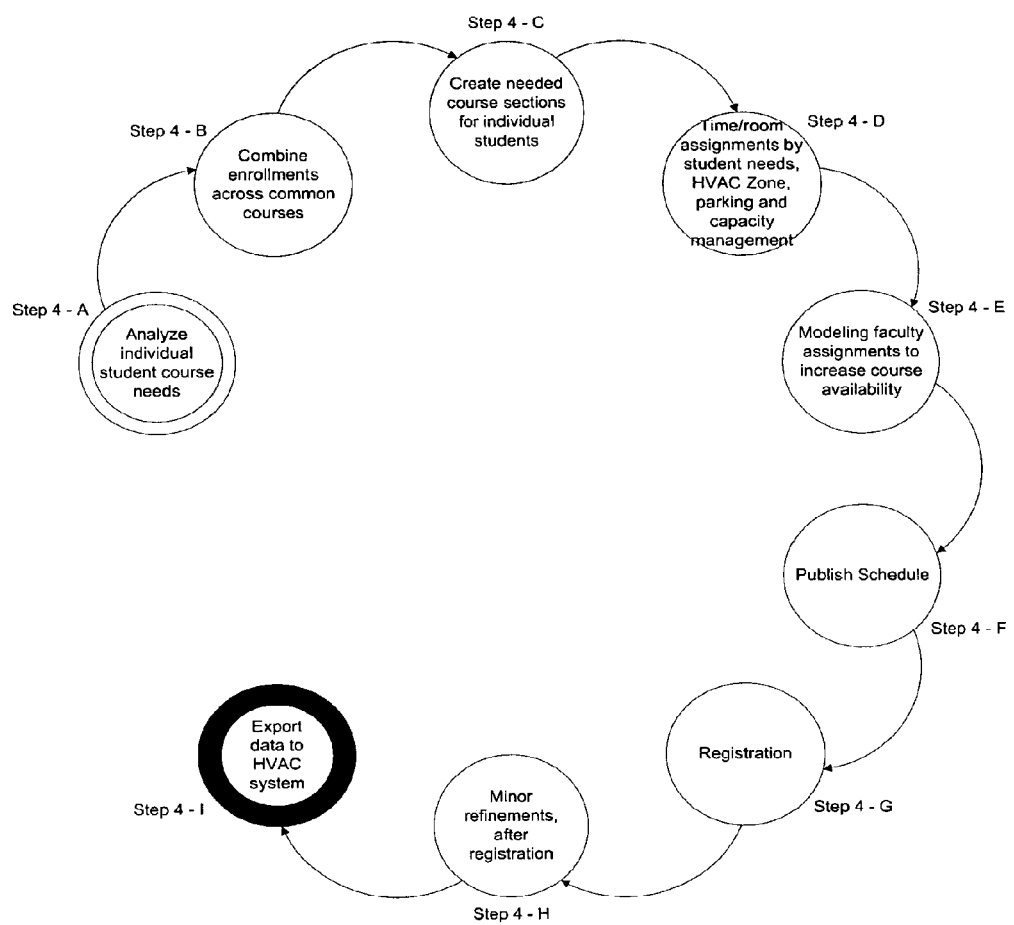

FIG. 4 shows the invention process flow for the Lock Step schedule approach. In this process, an institution follows these steps:

Step 4-A: Institution performs student-specific Program Analysis.

Step 4-B: Combine enrollments across programs, based on student-specific demand. To the extent possible, programs with common course offerings during the same part of the week collapse enrollments to reduce the number of low enrollment Course Sections.

Step 4-C: Create needed Course Sections, a result of the previous two steps.

Step 4-D: Time and room assignments or changes are made (optionally) without instructor constraints. Student time of day availability, HVAC Zone, parking, and capacity bottleneck management are all factored into the assignments. Ideally, assignments are made without being constrained by the time of day availability of the assigned instructor. If possible, the instructor is added after this step.

Step 4-E: Academic Departments make faculty assignments. Traditionally, these assignments occur before time slots are assigned.

Step 4-F: Publish schedule to students. This threshold typically locks all modifications until after registration (Step 4-H).

Step 4-G: Students register for classes that they can get conflict-free.

Step 4-H: Minor changes are made to the schedule to respond to significant, last minute scheduling problems identified during registration. The entire demand analysis process of the invention (Steps 4-A through 4-E) can be repeated after registration based on actual demand (versus projected demand) so as to identify high impact changes that were not anticipated through projected demand.

Step 4-I: Data from schedule is exported to HVAC automated system so as to maximize energy savings.

Figure 5:
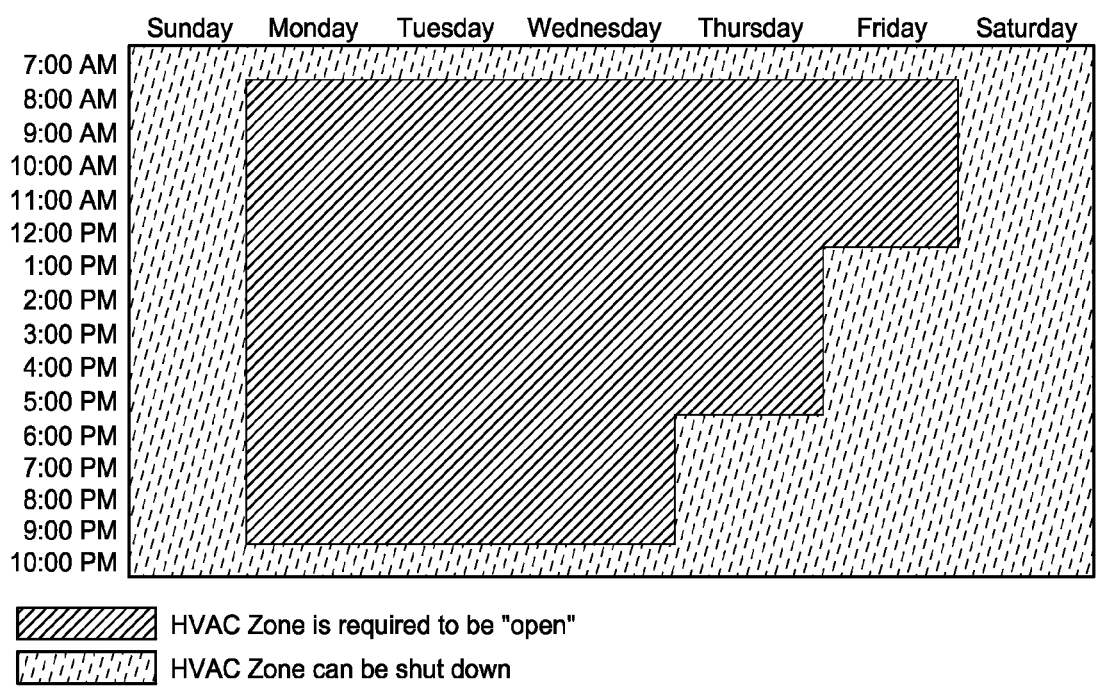

FIG. 5 shows the shutdown flexibility of a hypothetical HVAC Zone.

Figure 6:
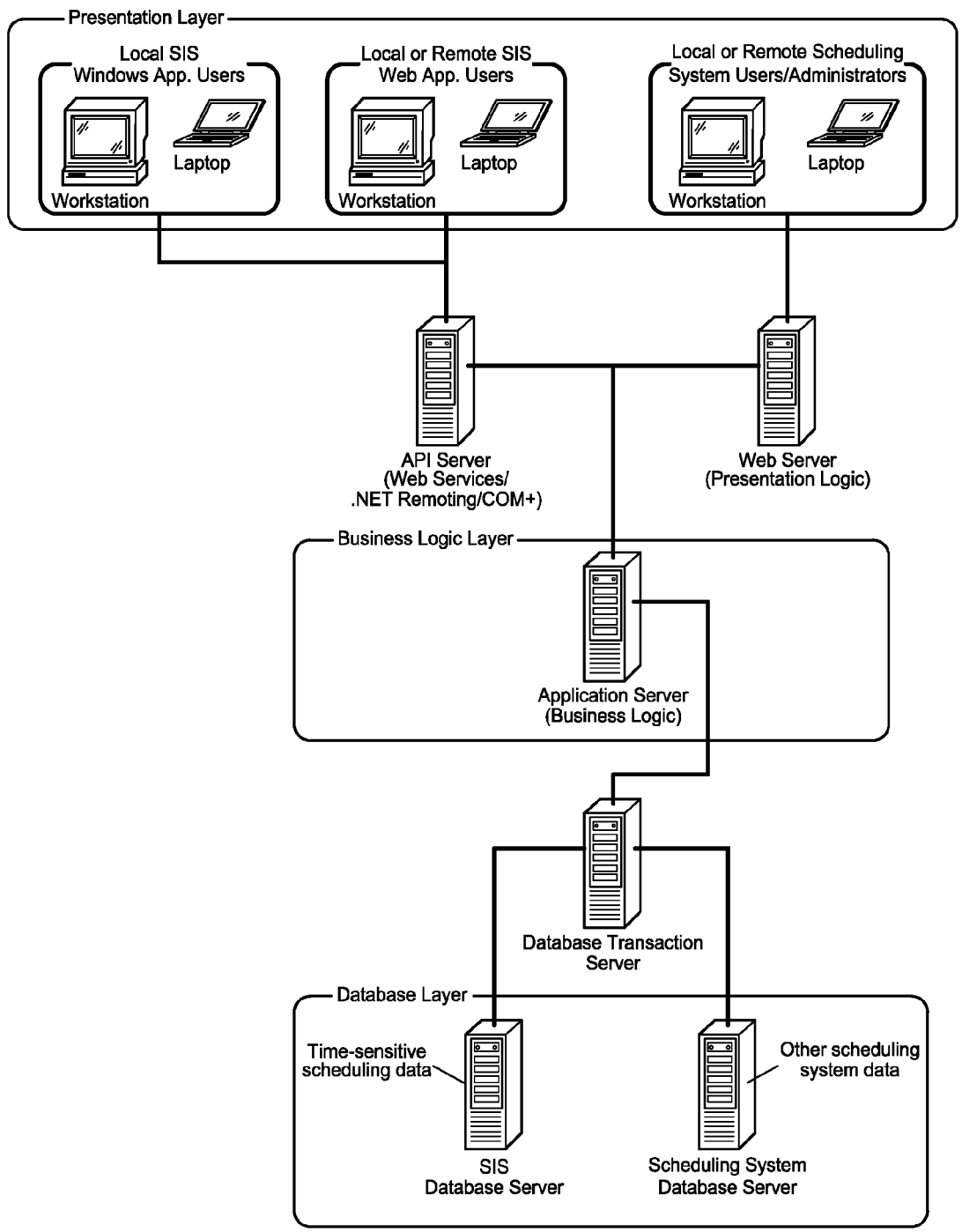

FIG. 6 shows a schematic of a system that supports the described, recommended integration.

DESCRIPTION OF THE PREFERRED EMBODIMENT

The following terms and concepts are important in order to understand the key issues in higher education schedule development covered in the invention.

Constraint Analysis—The process through which a college or university identifies bottlenecks in the assignment of timeslots and rooms before running a constraint-based scheduling algorithm.

Course Section—An individual offering of a course that must be assigned an instructor, meeting time, and room.

Degree Audit—The analysis of degree progress of existing students in their declared program of study and, correspondingly, their course needs in future terms to satisfy degree requirements.

Demand Analysis—The process through which a college or university interprets the course needs of their current student population.

Demand Driven Approach—The less common approach to scheduling in North America wherein a Timetable is developed down to the course (not Course Section) level and students register for courses, not Course Sections.

Historical Analysis—A form of Demand Analysis that is derived from the study of students enrolled in previous academic terms.

HVAC Zone—A block of space that is heated and air-conditioned by a distinct subset of the heating, ventilation, and air conditioning (HVAC) plant of a college or university.

Joint Demand—The measure of common demand between groupings of two or more sections of courses. This measure can be expressed as the number of common students needing a grouping of Course Sections. This measure is critical in determining what section should not be placed in conflicting time slots (e.g., high joint demand sections should be scheduled conflict-free of each other).

Lock Step—The fixed, non-elective, approach to academic schedule development common at technical institutions. Students join a cohort of students and are expected to follow that cohort through each term of pre-assigned Course Sections.

Master Schedule Approach—The predominant approach to higher education scheduling in North America wherein a Timetable is developed down to the Course Section level (including Timetable assignments) and students register for specific Course Sections.

Program Analysis—A form of Demand Analysis that is derived from the study of students' progress against their defined program of study.

Quantitative Demand—The application of Demand Analysis to determine the number of students needing a course and therefore, by using the maximum enrollment of that course, the number of section offerings that should be in the schedule (e.g., 200 students need a course that has a maximum enrollment of 50—therefore, there should be 4 sections of that course).

Roll forward—The common scheduling approach in North American colleges and universities featuring the use of a previous academic term as the basis for subsequent academic terms. This is almost always practiced in "like term" roll forwards (e.g., Fall 2003 is used as the basis for Fall 2004). This practice is easy in that the schedule needn't be recreated each term, only the dates need to be changed. It's also politically appealing in that it inherently minimizes change.

Student Survey Analysis—A form of Demand Analysis that is derived from the study of students' selections of desired courses for upcoming academic terms, constituting a plan for graduation.

Timetable—A schedule for an academic term consisting of scheduled Course Sections.

Student-specific Historical Analysis looks at the courses that individual students took in prior academic terms. The institution should choose prior terms that will be predictive of what will occur in the academic schedule that they are developing. In most cases, this will be "like" terms (e.g., Spring terms will be predictive of Spring terms, Fall terms of Fall terms, etc.). The result of this process is a historical quantitative and Joint Demand for the various courses offered by the institution.

The steps required for this component of the invention are: importing student data, importing schedules from previous terms in the analysis, determining quantitative demand, determining Joint Demand, subdividing quantitative demand and Joint Demand into significant sub-populations, merging data from multiple academic terms included in the analysis, importing data on active students, applying analysis to active students, dividing courses demand into Course Section demand per student, and aggregating the results for the entire student population. More detail for each step follows:

Import student information for all students who enrolled in Course Sections in the academic terms studied in the Historical Analysis from an institution's enterprise information system. This data is typically stored in two linked database tables—one containing the primary student data (student table) and one containing the Course Sections taken, the academic term and the student ID (student/section table).

Import the Master Schedules (section table) from the academic terms studied in the Historical Analysis and link the student/section data with the through the course ID of the student/section table.

Determine quantitative demand for courses for the active student population for the upcoming academic term, based on the weighted average analysis of previous academic terms (weighting typically gives more importance to recent terms over older terms). Tables 1 and 2 are an example of quantitative demand for hypothetical "Course 1" in two academic terms. The first column in the "Analysis" portion of Tables 1 and 2 calculates the percentage of all active students in each who took Course 1 in academic terms 1 and 2, respectively.

Determine Joint Demand between courses for overall student population based on analysis of previous academic terms (weighting typically gives more importance to recent terms over older terms). Joint Demand is derived from the last column in Tables 1 and 2. This analysis (shown in Tables 1 and 2) is similar to the quantitative demand analysis, except that the likelihood is based on the percentage of students who took another course and Course 1 (not the percentage of all active students).

Subdivide quantitative demand and Joint Demand into significant sub-populations derived from the student table (e.g., Major, Level, Gender, Day/Night and Status, etc.). Quantitative demand is broken down (in these tables) by Major, Level, Gender, Day/Night and Status. The analysis in the bottom portion of these Tables shows the percentage of all active students in a sub-population that took Course 1 during that academic term. In Table 3, each active student that is eligible to take Course 1 for an upcoming academic term has an inferred likelihood that they will take Course 1, based the student's demographic profile.

TABLE 1

| Took Course 1 in Term 1 | Major | Level | Gender | Day/Night | Status | Other Courses |
|---|---|---|---|---|---|---|
| Student 1 | A | 1 | M | D | Full-time | 2, 3, 4 |
| Student 2 | A | 1 | M | D | Full-time | 2, 3, 5 |
| Student 3 | A | 1 | M | D | Full-time | 2, 3, 5 |
| Student 4 | A | 1 | M | D | Full-time | 2, 3, 5 |
| Student 5 | A | 2 | M | D | Full-time | 2, 3, 5 |
| Student 6 | A | 2 | M | D | Part-Time | 5 |
| Student 7 | B | 1 | M | D | Full-time | 2, 3, 4 |
| Student 8 | B | 1 | M | D | Full-time | 2, 3, 4 |
| Student 9 | B | 3 | M | D | Full-time | 3, 4, 5 |
| Student 10 | C | 2 | M | D | Full-time | 5, 6, 7 |

TABLE 1-continued

| All Students - % of all active students that took Course 1 | Analysis - % of active students by sub-populations that took Course 1 | | | | | Joint Demand |
|---|---|---|---|---|---|---|
| | Major | Level | Gender | Day/Night | Status | |
| 10 of 25 students (40%) | A - 60% | 1 - 40% | M - 67% | D - 50% | FT - 45% | 2 - 70% |
| | B - 30% | 2 - 60% | F - 0% | N - 0% | PT - 20% | 3 - 80% |
| | C - 20% | 3 - 20% | | | | 4 - 40% |
| | | | | | | 5 - 70% |
| | | | | | | 6 - 10% |
| | | | | | | 7 - 10% |

Demographic Breakdown of all Students
Total Students: 25; Majors -10 (A), 10 (B), 5(C); Level - 15 (1), 5 (2), 5 (3); Gender -15 (M), 10 (F); Day/Night - 20 (D), 5 (N); Status - 20 (FT), 5 (PT)

The data under the heading "Analysis—% of active students by sub-populations that took Course 1" are derived in the following manor: Major "C" has 5 active students of which 1 student, or 20%, took Course 1 in term 1. A similar calculation can be made for level, gender, night/day and status. These same calculations apply to Tables 2 and 3.

The data under the heading "Joint Demand" are derived in the following manor: Course 2 was taken by 70% of all students who took Course 1 in term 1. These same calculations apply to Tables 2 and 3.

Merge results of analysis from multiple academic terms into one result set. This step consists of averaging the data from the term 1 (Table 1) and term 2 (Table 2) analysis for the sub-populations and Joint Demand. Weighting of most recent academic terms over earlier academic terms should typically be applied to this process. Using tables 1 and 2 as an example, 30% and 40% of students in Major "B" took Course 1 in terms 1 and 2, respectively. Weighting term 1 as 30% of the analysis and term 2 as 70% would yield a weighted average of 37% in the merged analysis—(30%×30%)+(40%×70%)=37%. A simple example of merged data with no weighting (terms 1 and 2 are given equal weight) is shown in Table 3, below:

TABLE 2

Took Course 1 in Term 2

| Student 11 | A | 1 | M | D | Full-time | 2, 3, 4 |
|---|---|---|---|---|---|---|
| Student 12 | A | 1 | M | D | Full-time | 2, 3, 5 |
| Student 13 | A | 1 | M | D | Full-time | 2, 3, 6 |
| Student 14 | A | 1 | M | D | Full-time | 2, 3, 5 |
| Student 15 | A | 1 | M | D | Full-time | 2, 3, 5 |
| Student 16 | A | 2 | M | D | Full-time | 2, 3, 5 |
| Student 17 | A | 2 | M | D | Full-time | 2, 3, 5 |
| Student 18 | A | 2 | M | D | Full-time | 2, 3, 5 |
| Student 19 | A | 2 | M | D | Full-time | 2, 3, 5 |
| Student 20 | A | 2 | M | D | Full-time | 2, 3, 5 |
| Student 21 | B | 2 | M | D | Full-time | 2, 3, 4 |
| Student 22 | B | 2 | M | D | Full-time | 2, 3, 4 |
| Student 23 | B | 1 | M | D | Full-time | 3, 4, 6 |
| Student 24 | B | 3 | F | D | Full-time | 3, 4, 5 |
| Student 25 | C | 2 | M | N | Full-time | 3, 5, 6 |

| All Students - % of all active students that took Course 1 | Analysis - % of active students by Sub-Populations that took Course 1 | | | | | Joint Demand |
|---|---|---|---|---|---|---|
| | Major | Level | Gender | Day/Night | Status | |
| 15 of 30 students (50%) | A - 67% | 1 - 40% | M - 70% | D - 56% | FT - 60% | 2 - 80% |
| | B - 40% | 2 - 80% | F - 10% | N - 20% | PT - 0% | 3 - 100% |
| | C - 20% | 3 - 20% | | | | 4 - 33% |
| | | | | | | 5 - 67% |
| | | | | | | 6 - 20% |

Total Students: 30; Majors -15 (A), 10 (B), 5(C); Level -15 (1), 10 (2), 5 (3); Gender - 20 (M), 10 (F); Day/Night - 25 (D), 5 (N); Status - 25 (FT), 5 (PT)

TABLE 3

Merged Analysis (assuming equal weighting of Term 1 and Term 2)

| All Students - % of all active students that will take Course 1 | Analysis - % of active students by Sub-Populations that will take Course 1 | | | | | Joint Demand |
|---|---|---|---|---|---|---|
| | Major | Level | Gender | Day/Night | Status | |
| 25 of 55 students (45%) | A - 64% | 1 - 40% | M - 69% | D - 53% | FT - 53% | 2 - 75% |
| | B - 35% | 2 - 70% | F - 5% | N - 10% | PT - 10% | 3 - 90% |
| | C - 20% | 3 - 20% | | | | 4 - 36% |
| | | | | | | 5 - 68% |
| | | | | | | 6 - 15% |
| | | | | | | 7 - 5% |

Import student data for active students and infer their likelihood to take a full load of courses for the upcoming term (based on the weighted average of the course loads they took in past terms). An example of the load analysis needed for each student is illustrated by the following: Student "X" has taken 11 and 15 hours, respectively, in terms 1 and 2. If the institution's full-time load is 15 hours, the institution may project that Student "X" will take a full load (based on the trend of his hours taken) or 13 hours (based on the average of his hours taken). Like merged demand analysis, described in Table 3, weighting may also be applied to student course load so that recent academic terms are considered as more predictive of course load than earlier academic terms.

Apply Historical Analysis of quantitative course demand by significant subpopulations to active students to enhance Demand Analysis. The result of this analysis is a probability that an active student will take any course in the Roll Forward schedule. In the Lock Step model, this probability is expressed as the likelihood that any active student will take any course in the list of active courses taught by the institution. In both cases, the process of applying past probabilities to active students implicitly replaces the need to apply trending to a series of historical demand results from two or more previous terms. An example of Historical Analysis from the previous steps applied to active students (including formulae) is shown in Table 4:

TABLE 4

| Active Students | Major | Level | Gender | Day/Night | Status | Likelihood to take course |
|---|---|---|---|---|---|---|
| Student 1 | A | 1 | M | D | Full-time | 56% |
| Student 2 | A | 1 | M | D | Full-time | 56% |
| Student 3 | A | 1 | M | D | Full-time | 56% |
| Student 4 | A | 1 | M | D | Full-time | 56% |
| Student 5 | A | 1 | M | D | Full-time | 56% |
| Student 6 | A | 1 | M | D | Full-time | 56% |
| Student 7 | A | 1 | F | D | Full-time | 43% |
| Student 8 | A | 1 | F | D | Full-time | 43% |
| Student 9 | A | 2 | M | D | Full-time | 62% |
| Student 10 | A | 2 | M | D | Full-time | 62% |
| Student 11 | A | 2 | F | D | Part-time | 40% |
| Student 12 | A | 3 | M | D | Full-time | 52% |
| Student 13 | A | 3 | M | D | Full-time | 52% |
| Student 14 | A | 3 | F | D | Full-time | 39% |
| Student 15 | A | 3 | F | D | Full-time | 39% |
| Student 16 | A | 3 | F | D | Full-time | 39% |
| Student 17 | B | 1 | M | D | Part-time | 41% |
| Student 18 | B | 1 | M | D | Full-time | 50% |
| Student 19 | B | 1 | F | D | Full-time | 37% |
| Student 20 | B | 1 | F | D | Full-time | 37% |
| Student 21 | B | 1 | F | N | Full-time | 29% |
| Student 22 | B | 2 | M | N | Part-time | 39% |
| Student 23 | B | 2 | M | D | Full-time | 56% |
| Student 24 | B | 2 | F | D | Full-time | 43% |
| Student 25 | B | 3 | M | N | Full-time | 37% |
| Student 26 | B | 3 | F | D | Full-time | 33% |
| Student 27 | C | 1 | M | D | Full-time | 47% |
| Student 28 | C | 1 | F | D | Full-time | 34% |
| Student 29 | C | 2 | M | D | Part-time | 44% |
| Student 30 | C | 3 | F | N | Part-time | 13% |
| Result | | | | | | 13.47 |

The data under the heading "Likelihood to take course" in Table 4 are derived in the following manor: The average of the merged likelihood data for each sub-population (Major, Level, Gender, Day/Night, & Status) of which a student is a member. For example, Student 1 can be calculated as: Average of (Major "A"—64% and Level "1"—40% and Gender "M"—69% and Day/Night "D"—53% and Status "Full-time"—56%)=56%.

To calculate Student-Specific Joint Demand, multiply the Student-Specific Quantitative Demand (see Table 4) for any course pair. For example, Student 1, as shown in Table 4, has a 56% predicted likelihood of taking Course 1. A similar calculation for Course 2 may indicate that Student 1 has an 80% predicted likelihood of taking Course 2. In this case, the Student-Specific Joint Demand for Student 1 taking Course 1 and Course 2 in the same term is: 56%×80%=44.8%.

Student/course analysis must be further divided into student/section analysis by predicting (from past course time selection tendencies) the likelihood that any active student will take any Course Section in the Roll Forward schedule. For any active students who did not take courses in the academic terms studied, the likelihood that they will take any Course Section will be evenly divided between all Course Sections offered. The process for the Lock Step model is similar, except that students are placed into Course Sections that are generated based on quantitative course demand (see below). The process for assessing student/section demand is as follows: Calculate the student time of day availability for each student based on the times of the Course Sections taken on previous terms (first start and last end per day, most common times and middle of the availability range). Merge student time of day availability with the times of the Course Sections associated with the course being analyzed to create a section probability score. If the probability that Student "X" will take Course 1 is 56%, then the sum of the probabilities that Student "X" will take each of the Course Sections of Course 1 must add up to 56%. The allocation of these probabilities to the various Course Sections of Course 1 must be accomplished by an formula that compares the time of day availability of Student "X" with the offering times and days of the Course Sections of Course 1. See Table 5, below, for a simple illustration of the recommended formula.

cesses of performing these adjustments are described in the Application of demand data section, below.

In the Lock Step model, student/course analysis is used to generate the correct number of Course Sections of any course. Once these Course Sections are generated, students are assigned to the Course Sections using a best-fit algorithm. The recommended processes of creating Course Sections and assigning students to those Course Sections are described in the Application of demand data section, below.

Program Analysis looks at the courses that individual students have taken in their program of study and infers which courses that those students will need/desire to take next. Detailed program data is typically available in Degree Audit systems. The student data detailing the courses that have been successfully completed is typically available in an institution's enterprise information system.

The steps required for this component of the invention are: importing program data, importing student data, determining program requirements that have been fulfilled, determining remaining courses, eliminating remaining courses that a student is not eligible to take, determining quantitative demand, determining Joint Demand, dividing quantitative course demand into Course Section demand per student, and aggregating the results for the entire student population. More detail for each step follows:

TABLE 5

| Historical Student Availability | Classes taken on Monday | Classes taken on Tuesday | Classes taken on Wednesday | Classes taken on Thursday | Classes taken on Friday | Classes taken on Saturday |
|---|---|---|---|---|---|---|
| 08:00 AM | 2 | 1 | 2 | 1 | 2 | 0 |
| 09:00 AM | 3 | 2 | 3 | 2 | 3 | 0 |
| 10:00 AM | 4 | 2 | 4 | 2 | 4 | 0 |
| 11:00 AM | 4 | 2 | 4 | 2 | 4 | 0 |
| 12:00 PM | 4 | 2 | 4 | 2 | 4 | 0 |
| 01:00 PM | 2 | 2 | 2 | 2 | 2 | 0 |
| 02:00 PM | 1 | 0 | 1 | 0 | 1 | 0 |
| 03:00 PM | 1 | 0 | 1 | 0 | 1 | 0 |
| 04:00 PM | 1 | 0 | 1 | 0 | 1 | 0 |

| Course Sections of Course 1 in Roll Forward Schedule | | | | Average of Historical Availability |
|---|---|---|---|---|
| Section A | 09:00 AM | 09:50 AM | MWF | 3 |
| Section B | 11:00 AM | 11:50 AM | MWF | 4 |
| Section C | 09:00 AM | 11:50 AM | T | 2 |
| Section D | 09:00 AM | 11:50 AM | S | 0 |
| | | Sum of Historical Availability | | 9 |

| Projected Demand for Course Sections of Course 1 | | | | Projected Demand |
|---|---|---|---|---|
| Section A | 09:00 AM | 09:50 AM | MWF | 18.667% |
| Section B | 11:00 AM | 11:50 AM | MWF | 24.889% |
| Section C | 09:00 AM | 11:50 AM | T | 12.444% |
| Section D | 09:00 AM | 11:50 AM | S | 0% |
| Total | | | | 56% |

Formula: Average of Historical Availability of Course Section/Sum of Historical Availability of all Course Sections × Projected Quantitative Course Demand.
Example (Student 1 and Section A): 3/9 × 56% = 18.667%

Once quantitative student/course demand is divided into quantitative student/section demand, the aggregate quantitative demand and Joint Demand for the entire active student population is simply the sum of these calculations for all individual students in the active pool. After the data is aggregated, adjustments to the Roll Forward schedule may be required to accommodate uneven demand for Course Sections of any course and/or high Joint Demand between Course Sections taught at the same time. The recommended pro- Import Program data that defines the course requirements of the active degrees of study from Degree Audit. The critical components needed for this component of the invention are the courses in the program, the program rules (e.g., take any three of these ten courses), course pre-requisites and co-requisites, and recommended order of taking courses.

A highly simplified, Lock Step program is shown in Table 6, below:

TABLE 6

| | Courses in Program | | |
|---|---|---|---|
| | Course 1 | Course 2 | Course 3 |
| Level 1 | A | B | C |
| Level 2 | D | E | F |
| Level 3 | G | H | I |
| Level 4 | J | J | L |

Determine program requirements fulfilled by students against their declared program of study. If a student is undeclared, the institution has two options: use only Historical and (optionally) Student Survey analysis, or compare progress against a manually created general education "mini-program" which prepares the student to enter a major program of study.

An example of student completion of the courses in the program shown in Table 6 is illustrated in Table 7, below:

TABLE 7

| Student Completion | Course 1 | Course 2 | Course 3 |
|---|---|---|---|
| Term 1 | A | B | |
| Term 2 | C | | |
| Term 3 | D | E | |

Determine courses remaining in the program of study. These are courses which should be taken next, based on the recommended order of taking courses defined for the program. This determination is made through the following steps: Eliminate courses that do not have pre-requisite requirements satisfied, since the demand for these courses is effectively nil. Determine the likelihood that each student will take each course.

A simplified determination of courses needed for the upcoming term (for the student in Table 7) is shown in Table 8, below:

TABLE 8

| Projected | Course 1 | Course 2 | Course 3 |
|---|---|---|---|
| Upcoming Term | F | G | |

The determination that the student will take Courses F and G is based on two factors—The student has taken 2 courses for 2 of 3 terms; and, Courses F and G are the next 2 courses in the recommended program progression (Table 6). In most cases, the result of the analysis (the percentage chance that a student will take any course in the schedule) will be less than 100%.

The probability that any student in the active population will take any course must now be summarized, along with Joint Demand between courses, in the same way that these analyses were summarized in the previous component (Student-specific historical demand analysis). See Table 4 for details.

Student/course probability is then further divided into student/section probability, and that result is used to calculate demand and Joint Demand for the entire active student population using the same process described in the previous component (Student-specific historical demand analysis). See Table 5 for details.

After the data is aggregated, adjustments to the Roll Forward schedule may be required to accommodate uneven demand for Course Sections of any course and/or high Joint Demand between Course Sections taught at the same time. The recommended processes of performing these adjustments are described in the Application of demand data section, below.

In the Lock Step model, student/course analysis is used to generate the correct number of Course Sections of any course. Once these Course Sections are generated, students are assigned to the Course Sections using a best-fit algorithm. The recommended processes of creating Course Sections and assigning students to those Course Sections are described in the Application of demand data section, below.

Student survey demand assessment polls students on their desire to take specific courses and their time of day availability throughout the scheduling week. Course modeling allows students to assess possible schedules of Course Sections that meet their needs and time of day availability, and are present conflict-free in the Roll Forward schedule.

The steps required for this component of the invention are: students logging into the web-based survey and being presented with a limited list of courses based on eligibility and academic program requirements, students selecting a desired graduation date, students selecting courses, students placing desired courses into one of the academic terms between the present and the desired graduation date, students inputting time of day availability, determining Course Sections that are selected and offered during student's time of day availability, modeling potential schedules to students, and students requesting access to unavailable Course Sections. More detail for each step follows:

Students log into a web-based Student Survey tool. This system should interact with the institution's security infrastructure, ideally through LDAP or Active Directory to eliminate redundancy of security definitions and to automatically link to the student's ID in an institution's enterprise information system (SIS).

The system limits selections to courses the student is qualified to take and recommends courses that will allow the student to make progress toward degree attainment. Both of these determinations are inferred from the Program analysis (see above).

Students select a desired graduation date. The traditional, four-year student of the past is less common in today's institutions. It is imperative, therefore, to accurately assess each student's academic goals individually. Once the student enters a desired graduation date, there is a significant benchmark against which success may be judged. Related applications of this approach can include on-time graduation guarantees wherein the institution agrees to provide access to the courses needed to satisfy a degree if the student agrees to stay within the parameters of one or many institutionally approved program "paths."

Students select courses from available pool of courses presented by system. Availability to take these courses must be inferred from rules accessed in the Program Survey. Elective courses should be placed in a shopping cart area, separated from the program requirements.

Students placing desired courses (other than electives) into academic terms accomplishes two primary tasks: further refinement of demand analysis based on intent to take a course in a specific term and graduation planning and modeling that is facilitated by a this exercise. Warnings to the student must be present when the plan is missing graduation requirements, falls outside of a maximum or minimum course load based on the student's previous enrollment load (from the student-specific historical demand analysis, see previous section) and institution policies. For example, a student who has taken an average of 15 credit hours of courses for the past academic terms in the historical analysis should be warned if he selects course totaling only 9 credit hours (including both program requirements and electives). Additionally, a student should be prevented from selecting more than the institutionally mandated maximum credit hour load of courses. There should also be a weighting system that allows students to allocate points to their most important courses. This system should be designed to give more points to students with more seniority. A simple example of this system, wherein student "X" is a Senior who is given 50 points to allocate, is shown in Table 9.

TABLE 9

| Student Survey Point Allocation | Course 1 | Course 2 | Course 3 | Course 4 | Course 5 |
|---|---|---|---|---|---|
| Student "X" weighting of selections | 30 points | 10 points | 5 points | 3 points | 2 points |

Students input their time of day availability in a week matrix wherein columns represent days and rows represent hours of each day (typically, 7:00 AM to 10:00 PM). Maximum and minimum availability requirements should be enforced based on students' weighted average enrollment load (from the student-specific historical demand analysis, see previous section). For example, an institution might require that a student who has traditionally taken a 15 credit hour load of courses should be available a minimum of 40 hours per week. A matrix of student time of day availability is shown in Table 10, below:

TABLE 10

|  | Sun | Mon | Tue | Wed | Thu | Fri | Sat |
|---|---|---|---|---|---|---|---|
| 6:00 AM-7:00 AM | N | N | N | N | N | N | N |
| 7:00 AM-8:00 AM | N | Y | Y | Y | Y | Y | N |
| 8:00 AM-9:00 AM | N | Y | N | P | N | P | N |
| 9:00 AM-10:00 AM | N | P | N | P | N | P | N |
| 10:00 AM-11:00 AM | N | P | N | P | N | P | N |
| 11:00 AM-12:00 AM | N | P | N | P | P | P | N |
| 12:00 AM-1:00 PM | N | P | P | P | P | P | N |
| 1:00 PM-2:00 PM | N | P | N | P | P | P | N |
| 2:00 PM-3:00 PM | N | P | P | P | P | P | N |
| 3:00 PM-4:00 PM | N | P | P | P | P | P | N |
| 4:00 PM-5:00 PM | N | Y | Y | Y | Y | Y | N |
| 5:00 PM-6:00 PM | N | N | N | N | N | N | N |
| 6:00 PM-7:00 PM | N | N | N | N | N | N | N |
| 7:00 PM-8:00 PM | N | N | N | N | N | N | N |
| 8:00 PM-9:00 PM | N | N | N | N | N | N | N |
| 9:00 PM-10:00 PM | N | N | N | N | N | N | N |

Your Availability: 11 Blocks (Yes)
31 Blocks (Yes/Preferred)
42 Total Blocks (40 Blocks Minimum)

Courses are cross-referenced with the Roll forward schedule to determine best schedules, returning complete schedule scenarios to the students. The algorithm that generates schedules for students is similar to the algorithm that subdivides quantitative student/course demand into quantitative student/section demand (see Table 5). The significant differences are that this process uses the actual student time of day availability (as defined in Table 9, versus the inferred student time of day availability shown in Table 5), and resulting schedule scenarios must be conflict-free. A best-fit algorithm, similar to commercial room assignment algorithms discussed in the description of the prior art, is recommended.

Students select complete, conflict-free schedules of desired Course Sections (not just courses). Students should then select most desired schedules so that this data can be used to further refine demand analysis. Courses that are selected, but not available conflict-free, should be considered as unmet demand and used to refine schedules (see section on application of demand data).

Once quantitative student/course demand is divided into student/section demand, the aggregate demand and Joint Demand for the entire active student population is simply the sum of these calculations for all individual students in the active pool. After the data is aggregated and weighted based on the points system illustrated in Table 9, adjustments to the Roll Forward schedule may be required to accommodate uneven demand for Course Sections of any course and/or high Joint Demand between Course Sections taught at the same time. The recommended processes of performing these adjustments are described in the Application of demand data section, below.

In the Lock Step model, student/course analysis is used to generate the correct number of Course Sections of any course. Once these Course Sections are generated, students are assigned to the Course Sections using a best-fit algorithm. The recommended processes of creating Course Sections and assigning students to those Course Sections are described in the Application of demand data section, below.

The results of the Demand Analysis must first be merged together before it can be applied to the academic schedule development process. Environmental factors at various colleges and universities will impact the relative merit of the above Demand Analysis processes. Therefore, the recommended embodiment of the merge process is a graphical user interface that allows users to weight the relative impact that the sources used should have on the merged result. This interface should also allow for the omission of one of the Demand Analysis processes in the final result. Once the data is merged together, the result is a multi-source projection of the likelihood that any active student will need or want any course in the curriculum. Additionally, in the Roll Forward model, this projection is refined to the Course Section level.

Figure 1:
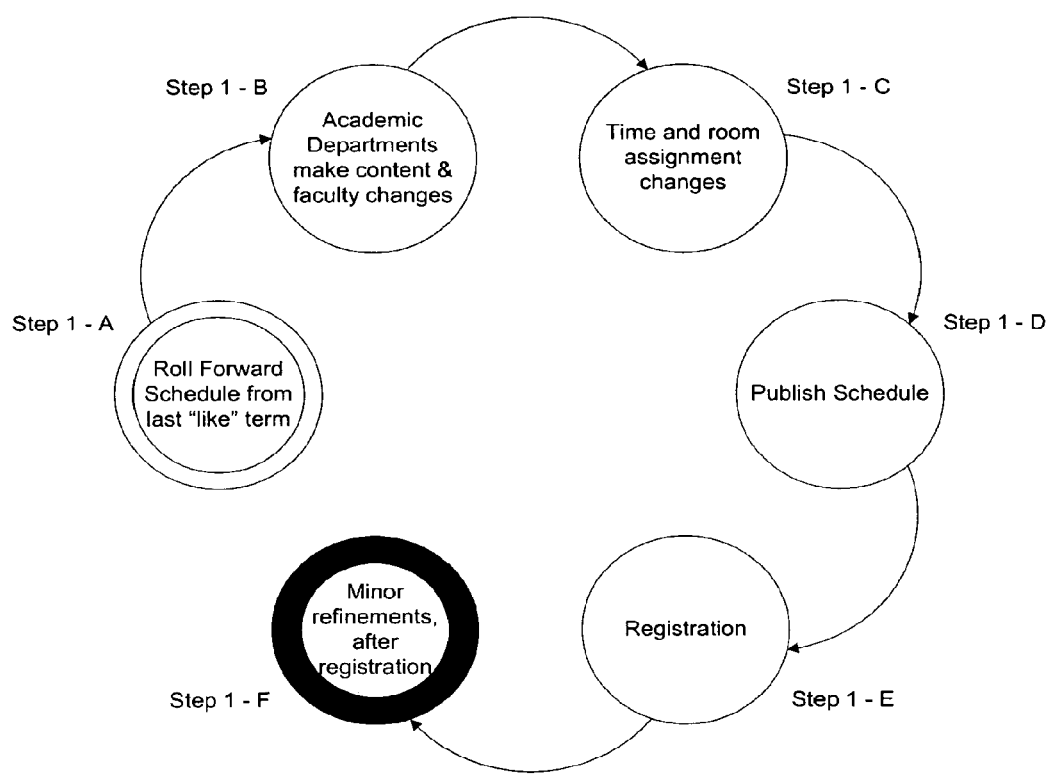
FIG. 1 shows the traditional process flow for the Roll Forward schedule approach. In this process an institution follows these steps:
 Step 1-A: The schedule is rolled forward from a previous term. This schedule includes the Course Sections complete with most instructor assignments, times and most room assignments.
 Step 1-B: Academic departments modify the rolled forward schedule. These changes are typically instructor, time and room changes as well as a limited number of additions and deletions of Course Sections based on a surface understanding of student needs.
 Step 1-C: Additional time and room assignments are made for all remaining Course Sections.
 Step 1-D: Publish schedule to students. This threshold typically locks all modifications until after registration (Step 1-E).
 Step 1-E: Students register for classes that they can get conflict-free.
 Step 1-F: Minor changes are made to the schedule to respond to significant, last minute scheduling problems identified during registration.
Figure 2:
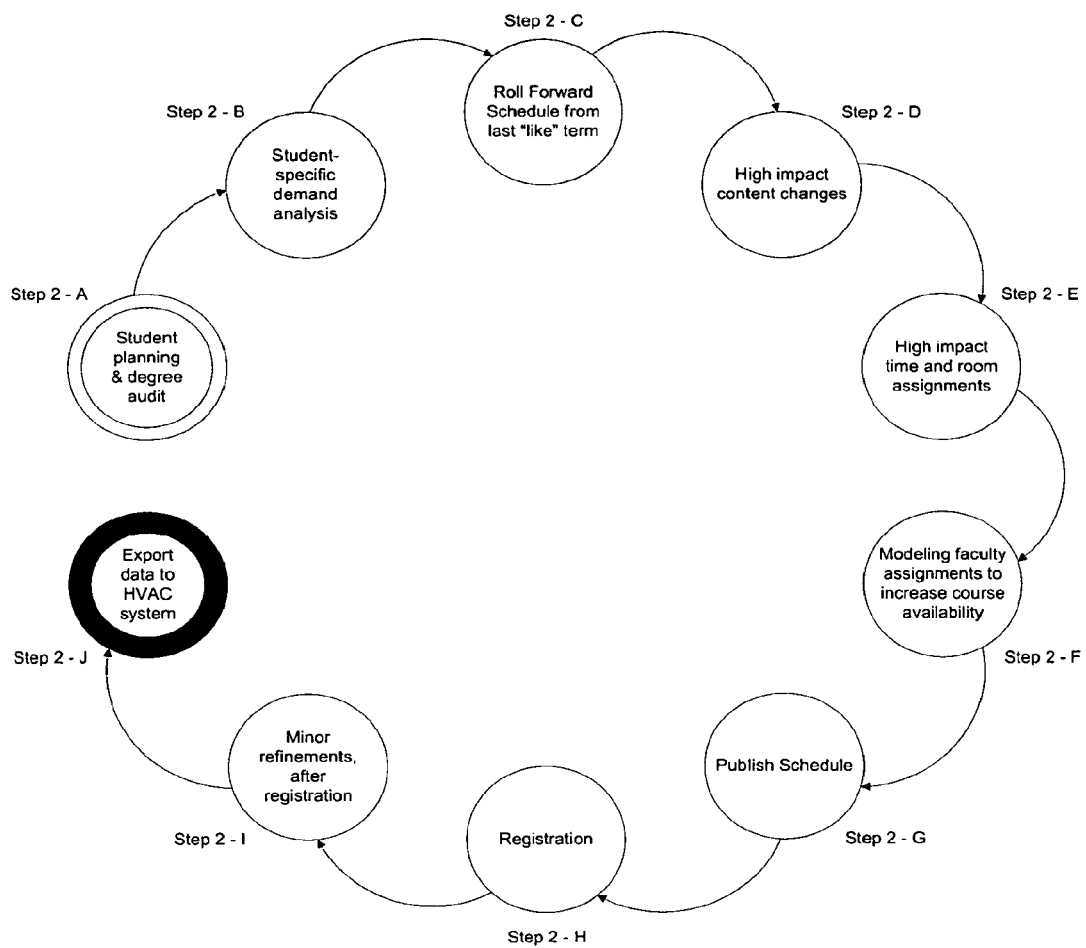
FIG. 2 shows the invention process flow for the Roll Forward schedule approach. In this process, an institution follows these steps:
 Step 2-A: Student participation in advisement, through Degree Audit and (optionally, Student Survey) is encouraged.
 Step 2-B: Institution performs student-specific demand analysis, obtaining and merging data from a Historical Analysis, Program Analysis, and (optionally) a Student Survey.

The merged demand analysis from the three sources, collectively, is represented as Step 2-B in FIG. 2 (only Program Analysis is used in FIG. 4, Step 4-A). A simplified example of merging demand results from the three sources is shown in Table 11, below:

TABLE 11

|  | Historical | Program | Student |
|---|---|---|---|
| Demand for Course |  |  |  |
| All Active Students | 13.75 | 15 | 16 |
| Weighting of Sources | 20% | 30% | 50% |
| Merged Result | (13.75 × 20%) + (15 × 30%) + (16 × 50%) = 15.25 | | 15.25 |

Note:
If a student has not completed a student survey, weighting would drop "Student" and become the following: Historical - 40%, Program - 60%.

Once quantitative student/course demand is divided into student/section demand, the aggregate demand and Joint Demand for the entire active student population is simply the sum of these calculations for all individual students in the active pool. After the data is aggregated, adjustments to the Roll Forward schedule may be required to accommodate uneven demand for Course Sections of any course and/or high Joint Demand between Course Sections taught at the same time. The recommended processes of performing these adjustments are described in the Application of demand data section, below.

In the Lock Step model, student/course analysis is used to generate the correct number of Course Sections of any course. Once these Course Sections are generated, students are assigned to the Course Sections using a best-fit algorithm.

computed demand of 240 students. This computed demand is then divided by the maximum enrollment of the course to derive the required number of Course Sections.

Additional columns should include Students Impacted, Graduating Students Impacted and Overall Weighted Cost. See table 12, below:

TABLE 12

| Subject | Course | Meeting Type | Sections Offered | Historical Simple | Historical Recommended | Program Needed | Student Needed | Sections Needed | Students Needed | Graduating Students | Weighted Cost |
|---|---|---|---|---|---|---|---|---|---|---|---|
| ECO | 200 | LEC | 7 | 10 | 10 | 11 | 10 | 3 | 125 | 88 | 188 |
| ENG | 100P | LEC | 11 | 14 | 12 | 14 | 14 | 3 | 114 | 80 | 148 |
| ENG | 125 | LEC | 8 | 11 | 11 | 10 | 11 | 3 | 101 | 74 | 132 |
| MAT | 101 | LEC | 10 | 11 | 12 | 11 | 10 | 1 | 90 | 79 | 111 |
| PSY | 327 | LEC | 8 | 11 | 12 | 10 | 10 | 3 | 80 | 74 | 110 |
| BUS | 480 | IND | 10 | 12 | 12 | 14 | 16 | 3 | 91 | 49 | 91 |
| HPE | 101 | LEC | 10 | 12 | 12 | 14 | 11 | 3 | 88 | 48 | 88 |
| MAT | 216 | LEC | 10 | 10 | 12 | 15 | 14 | 4 | 43 | 41 | 86 |
| SOC | 100 | LEC | 5 | 7 | 8 | 11 | 10 | 4 | 80 | 32 | 80 |
| COM | 430 | INT | 6 | 7 | 9 | 10 | 10 | 4 | 88 | 27 | 79 |
| HON | 488 | RCH | 12 | 16 | 16 | 16 | 16 | 4 | 48 | 32 | 74 |
| PSY | 100 | LEC | 6 | 9 | 9 | 10 | 10 | 3 | 49 | 41 | 74 |

Quantity Low; Quantity High; Wrong Time; Joint Demand; HVAC Zone; Parking

The recommended processes of creating Course Sections and assigning students to those Course Sections are described in the Application of demand data section, below.

The application of demand data takes two distinct forms: Roll Forward schedule refinement and Lock Step schedule creation. In both forms, demand analysis must be translated from number of students needing a course to the number of Course Sections to offer. This is done by simply dividing the number of students needing the course by the maximum enrollment of the course. In other words, if 125 students need a course with a maximum enrollment of 50, 3 Course Sections are needed (125/50=2.5, rounded up to 3).

The process of Roll forward schedule refinement involves presenting recommended changes along with the supporting data made available from the Demand Analysis process. In this phase, the invention focuses on the impact of adding a Course Section, eliminating an existing Course Section or moving a Course Section to a different time. There are four discrete parts to this process: Quantity Low, Quantity High, Wrong Time, and Joint Demand. The recommended user interface from which to review and then accept or reject recommended changes is a top "N" analysis tool. Specifically, this tool should consider the number of students impacted by possible schedule content and time changes, and the significance of that impact on those students.

Quantity low analysis focuses on those courses where the merged Demand Analysis suggests that there is a higher demand for Course Sections than can be accommodated by the Roll Forward schedule. The projected demand for each course in this group, expressed as a recommended number of Course Sections needed in the Master Schedule, is displayed in the following columns: Historical Offerings (weighted number of sections taught in the past), Historical Analysis projected need, Program Analysis projected need, Student Survey projected need, and Merged Analysis projected need.

For each column the number of Course Sections recommended is the result of a distinct form of Demand Analysis. This number is derived from the possible students who need/want the course multiplied by the likelihood that they will take the course. For example, four hundred students who each have a likelihood of 60% to take a course would result in a Each column should have supporting data, which can be accessed by selecting that cell within any row (course). This drill-down information will contain term-by-term results of Historical Analysis and specific students projected to need/desire that course for all of the columns. The Merged Analysis score is then weighted using the following factors to generate an impact score, or cost, of offering too few Course Sections.

1. Students impacted, which is the merged demand result of number of students who need/desire the course less the number of students who can take the course based on the anticipated number of Course Sections. For example, if 240 students need/desire the course and only 150 can take it, the impact score would be the difference (240-150, or 90 students)
2. Seniority is a measure of the impact of a student's degree progress. To improve graduation rates, it is important to focus on students who are closer to degree attainment rather than those who are starting a degree. A user-definable seniority score is recommended. For example, a four-year degree might weight seniority in each class as follows: senior—200%, junior—100%, sophomore—50%, freshman—25%.
3. Requirement is a measure of how important a course is to each student's degree attainment. If the course is an absolute requirement, then the weighting should be 100%. If the course is in a group of ten courses wherein three must be completed, then the weighting should be 30%. Electives should be 1% (0% would ignore them altogether).
4. Scarcity is a measure of how many Course Sections are offered. If only one Course Section is offered, the weighting might be 200% to add a second offering. If two, then the weighting might be 100%. If three, then 75%- and so on.
5. Catch-up is a measure of how the student's seniority corresponds with an unfulfilled requirement's recommended order of taking courses within a program of study (see program analysis section of the student-specific demand analysis component). If this course should have been taken earlier in program, or if it has been taken and failed, the weighting should be increased. If the student's level is lower than the course's recommended level, it should be downgraded. For example, a course wherein the recommended term is the 6$^{th}$ term of an 8 term program might have a catch-up weighting of 150% for a level 7 student. If it is a level 8 student, a higher weight would apply (250%). Correspondingly, a level 5 student who is eligible to take the course might apply a 50% weighting.

6. Pre-requisite is a measure of a course's importance in qualifying a student to take subsequent courses in the program of study. A pre-requisite of a required course should be weighted based on the Requirement measure for the course(s) of which it is a pre-requisite. For example, a course that is a pre-requisite of a course that has a 100% Requirement weighting might have a weighting of 200%. If the course has a 50% Requirement weighting, the pre-requisite weight might be 150%.

Overall weighting=Students impacted×Seniority weighting×Requirement weighting×Scarcity weighting×Catch-up weighting×Pre-requisite weighting. An example is shown in Table 13, below:

TABLE 13

| Students | Seniority | Requirement | Scarcity | Catch-up | Pre-requisite | Weighted Cost |
|---|---|---|---|---|---|---|
| 125 | 183% | 100% | 25% | 164% | 200% | 188 |

Quantity high analysis focuses on those courses where the merged Demand Analysis suggests that there is a lower demand for Course Sections than is accommodated by the Roll Forward schedule. The projected demand for each course in this group, expressed as a recommended number of Course Sections needed in the Master Schedule, is displayed in the following columns: Historical Offerings (weighted number of sections taught in the past), Historical Analysis projected need, Program Analysis projected need, Student Survey projected need, and Merged Analysis projected need.

For each column the number of Course Sections is the result of recommended number of Course Sections from a distinct form of Demand Analysis. Possible students who need/want the course multiplied by the likelihood that they will take the course.

Additional columns should include Sections to Remove, Seats Freed and Overall Weighted Cost.

Like Quantity Low, each column has supporting data, which can be accessed by selecting that cell within any row (course). This drill-down information will contain term-by-term results of Historical Analysis and specific students projected to need/desire that course for all of the columns. The Merged Analysis score is then weighted using the following factors to generate an impact score, or cost, of offering too many Course Sections.

1. Excess sections measures the Course Sections deemed to be unneeded by the merged analysis. For example, if there are three Course Sections that could be eliminated, the impact score might be 3. To balance this score with Quantity Low (which is based on number of students, not Course Sections, it is recommended that this number is multiplied by 50 (3×50=150).
2. Empty seats measures the seats freed to alternative uses by eliminating Course Sections. For example, if the maximum enrollment of an eliminated Course Section is 100, then the multiplier might be 200%. If 50, the multiplier might be 100%. If 25, the multiplier might be 50%.
3. Prime time measures the Course Sections that are taught during peak times during the scheduling week wherein space is at a premium. If an excess Course Section is to be offered during the highest density time slot in the week, the weighting might be 200% (otherwise, it would be as low as 100% for the lowest density time slots).
4. Building shutdown is a measure of potential energy savings that might result from eliminating offerings. If a Course Section is assigned or configured to be assigned to a room in an HVAC Zone that can be shut down (there are no required non-academic uses of other rooms in that HVAC Zone), then weighting should be a minimum of 100% (if not, the weighting might be 50%). If the anticipated time of the Course Section is one hour after the last or one hour before the first activity in the HVAC Zone, the weight might be 200%. Two hours might be 300%. The calculation is the same as the HVAC zone aware timetabling calculation outlined in FIG. 5.
5. Part-time instructor is a measure of the ability to reduce instructional costs by reducing an offering. For example, if a part-time instructor is teaching the Course Section or if the instructor is TBA, then the weight might be 100%. If a tenured faculty is assigned, then the weighting might be 25%.
6. Room Scarcity is a measure of the demand for the room type that the Course Section would be using. For example, a Course Section that needs a Microbiology Lab type that is already in use 75% of the scheduling week might have a weight of 200%. If the room type is in use 50% of the time, the weight might be 100%.

Overall weighting=Excess sections×Empty seats×Prime time×Prime space×Building shutdown×Part-time instructor×Room scarcity. An example is shown in Table 14, below:

TABLE 14

| Excess sections | Empty seats | Prime time | Building shutdown | Part-time instructor | Room scarcity | Weighted cost |
|---|---|---|---|---|---|---|
| 150 | 50% | 200% | 200% | 100% | 150% | 450 |

Quantity Low and Quantity High analysis, collectively, are represented as Step 2-D in FIG. 2.

Course/Time/Day analysis focuses on the need to move one or more Course Sections to different parts of the scheduling week than the times/days currently in the Roll Forward schedule. Course/Time/Day analysis is the result of an inferred matrix of student demand by Course/Time/Day. This inferred matrix is the product of two individual analyses: Student time of day availability and student demand. The former analysis is best performed as a matrix, wherein each student who may take the course being analyzed has a time of day availability value in each cell (hour of each day of the scheduling week) which is the result of that student's historical time of day availability (see Table 5 for an analogous example).

The student time of day availability matrix must then be cross-referenced with student demand. In this step, each student's time of day availability is multiplied by the likelihood that the student in question might take the course in question (see Table 5 for a simplified illustration of this process). When this information is aggregated across all students who might take the course in question, the result for all students—cross referenced with offering times of the Course Sections—is shown in Table 15.

TABLE 15

| Projected Demand for Course Sections of a Course (Max. Enrollment = 75) | | | | Projected Demand | Over/Under Demand |
|---|---|---|---|---|---|
| Section A | 09:00 AM | 09:50 AM | MWF | 87 | +12 |
| Section B | 11:00 AM | 11:50 AM | MWF | 125 | +50 |
| Section C | 09:00 AM | 11:50 AM | T | 52 | −23 |
| Section D | 09:00 AM | 11:50 AM | S | 5 | −70 |
| Total | | | | 269 | |

Based on the analysis above, Section D should be moved to MWF mornings to take the excess demand from Section A and Section B. This change would, of course, could only be made if an acceptable room and instructor were available. The projected need to change time/day for each course in this group, expressed as a recommended number of Course Sections needed to be moved in the Master Schedule (which would be 1 in the example shown in Table 15), is displayed in addition to the following columns of support data: Students impacted (62 in the example above—which is the excess demand from Section A and Section B—provided that the 5 students available on Saturday could take a different Course Section of the course), Graduating Students Impacted and a weighted cost so that time/day issues for each course can be ranked by relative impact.

Like Quantity Low and High, each column has supporting data, which can be accessed by selecting that cell within any row (course). This drill-down information will contain term-by-term results of Historical Analysis and specific students projected to need/desire that course by time/day.

Weighting, used to calculate weighted cost, is the same as Quantity Low weighting. Course Sections that are moved to different time slots, either one at a time or in bulk, should be run through a timetabling algorithm that selects the time slot and room simultaneously. Timetabling is also not novel to this process (it is simply a required step that exists in the prior art). It is recommended that an institution consider making time slot changes, when possible, before assigning an instructor to the Course Section. Selecting the time slot before the instructor ensures that the Course Section has the maximum range of available time slots, not just the time slots wherein a specific instructor is available to teach.

Joint Demand Analysis focuses on the degree to which two or more Course Sections that conflict with each other in the Roll forward schedule are needed by the same students, necessitating that one or more Course Sections by moved to a different time slot. The basis of this information is student-specific demand analysis such as the Historical Analysis shown in the final column of Table 3. The steps for calculating Joint Demand are as follows: Identify each Course Section pair that has common students, Calculate the weighted number of students impacted (the product of the section probability for each student), Weight the cost of the Joint Demand by course using Quantity Low weighting. Tables 16 and 17, respectively illustrate these steps:

TABLE 16

| Student | Courses |
|---|---|
| Student 1 | 1, 2, 3 |
| Student 2 | 1, 2, 3 |
| Student 3 | 1, 2, 3 |
| Student 4 | 1, 2, 3 |
| Student 5 | 1, 2, 4 |
| Student 6 | 1, 5 |
| Student 7 | 1, 3, 4 |
| Student 8 | 2, 3, 4 |
| Student 9 | 3, 4, 5 |
| Student 10 | 2, 5 |

Note: This illustration is simplified in that probabilities of students taking courses are considered 100% (which is rarely the case in a Roll Forward model).

TABLE 17

| Pairs | # of Students |
|---|---|
| 1-2 | 5 |
| 1-3 | 5 |
| 1-4 | 2 |
| 1-5 | 1 |
| 2-3 | 5 |
| 2-4 | 2 |
| 2-5 | 1 |
| 3-4 | 3 |
| 3-5 | 1 |
| 4-5 | 1 |

The projected number of Course Sections in conflict is displayed in addition to the following columns: Required Sections in Conflict (the number from the previous column multiplied by the Required weighting from the Quantity Low analysis), Students impacted (weighted number of students affected by projected conflicts), Graduating Students impacted (weighted number of graduating students affected by projected conflicts), and Weighted Cost (the relative impact of conflicts on students calculated in the same way as Quantity Low weighting. Each column has supporting data, which can be accessed by selecting that cell within any row (course).

Course Sections that are moved to different time slots, either one at a time or in bulk, should be run through a timetabling algorithm that selects the time slot and room simultaneously. Timetabling is also not novel to this process (it is simply a required step that exists in the prior art).

Course/Time/Day Analysis, Joint Demand Analysis, and HVAC Zone aware timetable optimization (see below), collectively, are represented as Step 2-E in FIG. 2.

The process of Lock step schedule creation involves generating the recommended number of Course Sections based on Demand Analysis along with the supporting data regarding specific students projected to take each Course Section. The result is an efficient schedule (superfluous offerings are eliminated), and a student-friendly schedule (student conflicts are minimized by assigning meeting times that consider Joint Demand).

Properly generating the correct number of Course Sections involves verification of student progress against their program of study (Program Analysis, see Tables 6, 7 and 8). Then, there are a variety of steps that increase efficiencies. First, to the extent possible, the system combines low enrollment Course Sections from different programs of study. Next, the system looks for flexibility to move students out of low enrollment Course Sections into other courses which they are eligible to take (they have fulfilled pre-requisite requirements). See table 18, below:

TABLE 18

| Course (Max. Enrollment = 50) | A | B | C | D |
|---|---|---|---|---|
| Students in Program 1 | 30 | 1 | 20 | 30 |
| Students in Program 2 | 15 | 3 | 1 | 25 |
| Students in Program 3 | 10 | 2 | 7 | 25 |
| Total Students | 55 | 6 | 28 | 80 |
| Course Sections | 2 | 1 | 1 | 3 |

Notes: Students that could be combined from two or more programs are shaded. The system would attempt to move the 5 extra students from Course A, or the 6 students from Course B, to another course (if they were eligible to take the course and it was in their programs of study).

Next, the system looks for opportunities to wheel the offering order (the academic term, or level, in which they are offered) of low enrollment courses in different programs of study to the extent that the offering order is flexible. For example, a program that runs eight academic terms and has low anticipated enrollments in the final four academic terms would be a candidate for wheeling (provided that the courses in the final four terms were not all fixed to an offering order because of pre-requisite rules). The table below shows how the invention could wheel courses with a flexible offering order. Numbers represent courses that are traditionally taught in a certain term of the eight term program (e.g., a "5" represents courses that are traditionally taught in a student's fifth academic term in the eight term program). See Table 19, below:

TABLE 19

| Academic Term | Course Offering Order | | | | | | |
|---|---|---|---|---|---|---|---|
| 2005-1 | 5 | 6 | 7 | 8 | | | |
| 2005-2 | | 6 | 7 | 8 | 5 | | |
| 2005-3 | | | 7 | 8 | 5 | 6 | |
| 2005-4 | | | | 8 | 5 | 6 | 7 |

Finally, unlike the Roll Forward model, students are placed into Course Sections (vs. going through open registration). This process, sometimes referred to as sectioning, is the optimal placement of students so as to minimize the required number of Course Sections and maximize the range of acceptable time slots that can be used based on common time of day availability of the students assigned to a Course Section. Sectioning is a complex optimization process that has been solved in various ways in commercial and homegrown software systems. Unlike the steps before it (merging demand from multiple programs, moving students from a low demand course, and wheeling the offering order) that minimize the number of Course Sections required to meet demand, sectioning is not novel to this process (it is simply a required step that exists in the prior art).

The complete process of properly generating the correct number of Course Sections is represented as Steps 4-B and 4-C in FIG. 4.

Course Sections should be run through a timetabling algorithm that selects the time slot and room simultaneously. Timetabling is also not novel to this process (it is simply a required step that exists in the prior art). As mentioned above in roll forward schedule refinement, it is beneficial to select time slots before assigning an instructor to a Course Section. Time slot assignments, as in the Roll Forward model, are made so as to maximize student access to the courses they need. Timetabling driven by student needs and HVAC Zone aware timetable optimization (see below), collectively, are represented as Step 4-D in FIG. 4.

An additional step, which is recommended in most cases, is to pass the information regarding the Course Sections that the system predicted each student should take back to the institution's registration system. This step can either replace or streamline the registration process while it ensuring that the integrity of the schedule is maintained. Without this step, students might arbitrarily choose courses and disrupt possible efficiencies.

The process of HVAC zone aware timetable optimization involves two primary components: recognition of weeks during the scheduling year that have low space demand, and manipulating the Timetable so as to maximize energy savings during those weeks. While HVAC zone aware timetable optimization is the third component of the invention listed, this manipulation should be done in Step 2-E (FIG. 2) or 4-D (FIG. 4), along with time changes to accommodate student need.

The invention allows users to assess which HVAC Zones have shutdown flexibility (e.g., no required use of space, like office hours or computer labs, for part of the total campus scheduling week). Shutdown flexibility of a hypothetical HVAC Zone is shown in FIG. 5.

Next, the system optimally manipulates the Timetable so as to keep HVAC Zones with shutdown flexibility unoccupied for contiguous blocks of time. This is accomplished by packing utilization into contiguous blocks of time during times when the HVAC Zones are needed. In this model, there is an assignment cost of placing an activity in a timeslot that is outside the required hours that the HVAC Zone must be open. This cost becomes increasingly higher as the time slots extend from the previous required timeslot and/or next required timeslot. An example of how this weighting, which might add 1 unit of assignment cost per hour, might be calculated is shown in Table 21, below:

TABLE 21

| | Sunday | Monday | Tuesday | Wednesday | Thursday | Friday | Saturday |
|---|---|---|---|---|---|---|---|
| 7:00 AM | 25 | 1 | 1 | 1 | 1 | 1 | 19 |
| 8:00 AM | 24 | 0 | 0 | 0 | 0 | 0 | 20 |
| 9:00 AM | 23 | 0 | 0 | 0 | 0 | 0 | 21 |
| 10:00 AM | 22 | 0 | 0 | 0 | 0 | 0 | 22 |
| 11:00 AM | 21 | 0 | 0 | 0 | 0 | 0 | 23 |
| 12:00 PM | 20 | 0 | 0 | 0 | 0 | 0 | 24 |
| 1:00 PM | 19 | 0 | 0 | 0 | 0 | 1 | 25 |
| 2:00 PM | 18 | 0 | 0 | 0 | 0 | 2 | 26 |
| 3:00 PM | 17 | 0 | 0 | 0 | 0 | 3 | 27 |
| 4:00 PM | 16 | 0 | 0 | 0 | 0 | 4 | 28 |
| 5:00 PM | 15 | 0 | 0 | 0 | 0 | 5 | 29 |
| 6:00 PM | 14 | 0 | 0 | 0 | 1 | 6 | 30 |
| 7:00 PM | 13 | 0 | 0 | 0 | 2 | 7 | 31 |
| 8:00 PM | 12 | 0 | 0 | 0 | 3 | 8 | 32 |

TABLE 21-continued

|  | Sunday | Monday | Tuesday | Wednesday | Thursday | Friday | Saturday |
| --- | --- | --- | --- | --- | --- | --- | --- |
| 9:00 PM | 11 | 0 | 0 | 0 | 4 | 9 | 33 |
| 10:00 PM | 10 | 1 | 1 | 1 | 5 | 10 | 33.5 |

In the Roll forward model, savings must be accomplished by moving Course Sections to different HVAC Zones or meeting times. These moves must be limited to Course Sections that cause an HVAC Zone to be conditioned for additional hours. In the Lock Step model, where the schedule is generated from scratch each term, the invention adds a feature to traditional timetabling algorithms that automatically packs HVAC Zones by factoring these issues into time slot and room assignment.

The next step in this phase of the invention is multiplying the time factor from by the degrees that the space must be conditioned. This matrix should be stored for each month of the year, to reflect changes in climate per month as shown in Table 22, below:

TABLE 22

|  | Sunday | Monday | Tuesday | Wednesday | Thursday | Friday | Saturday |
| --- | --- | --- | --- | --- | --- | --- | --- |
| 7:00 AM | 5 | 5 | 5 | 5 | 5 | 5 | 5 |
| 8:00 AM | 7 | 0 | 0 | 0 | 0 | 0 | 7 |
| 9:00 AM | 9 | 0 | 0 | 0 | 0 | 0 | 9 |
| 10:00 AM | 12 | 0 | 0 | 0 | 0 | 0 | 12 |
| 11:00 AM | 13 | 0 | 0 | 0 | 0 | 0 | 13 |
| 12:00 PM | 14 | 0 | 0 | 0 | 0 | 0 | 14 |
| 1:00 PM | 15 | 0 | 0 | 0 | 0 | 15 | 15 |
| 2:00 PM | 15 | 0 | 0 | 0 | 0 | 15 | 15 |
| 3:00 PM | 14 | 0 | 0 | 0 | 0 | 14 | 14 |
| 4:00 PM | 13 | 0 | 0 | 0 | 0 | 13 | 13 |
| 5:00 PM | 12 | 0 | 0 | 0 | 0 | 12 | 12 |
| 6:00 PM | 10 | 0 | 0 | 0 | 10 | 10 | 10 |
| 7:00 PM | 9 | 0 | 0 | 0 | 9 | 9 | 9 |
| 8:00 PM | 8 | 0 | 0 | 0 | 8 | 8 | 8 |
| 9:00 PM | 7 | 0 | 0 | 0 | 7 | 7 | 7 |
| 10:00 PM | 5 | 5 | 5 | 5 | 5 | 5 | 5 |

Merging these data with the size of the HVAC Zone gives the final result. This result includes the timeslot, degree hours and size. Assuming a weight of 1 per 10,000 square feet, the formula for a 100,000 square foot HVAC Zone would be 10×timeslot weight×degree with timeslot and degree hour weighting from Tables 18 and 19, respectively would yield a result shown in Table 23, below:

The final step in this phase of the invention is to pass scheduling data to the institution's automated HVAC management systems, so that that system can efficiently manage the HVAC Zone conditioning. This step is represented as Step 2-J (FIG. 2) and Step 4-I (FIG. 4).

The approach of parking aware timetable optimization factors the following issues into Timetable development automatically: parking load analysis by subset of scheduling week for academic and non-academic uses, parking inventory and building-to-parking lot relationship, constraint scheduling that places academic and non-academic activities into time slots and rooms based (in part) on available parking, and the financial analysis of rental income (stalls) and rental expenses (lots) related to the scheduling process.

While parking aware timetable optimization is the fourth component of the invention listed, this manipulation should be done in Step 2-E (FIG. 2) or 4-D (FIG. 4), along with time changes to accommodate student need.

As mentioned in the invention summary, an institution might know that the majority (75%) of their day students live

TABLE 23

|  | Sunday | Monday | Tuesday | Wednesday | Thursday | Friday | Saturday |
| --- | --- | --- | --- | --- | --- | --- | --- |
| 7:00 AM | 1250 | 50 | 50 | 50 | 50 | 50 | 950 |
| 8:00 AM | 1680 | 0 | 0 | 0 | 0 | 0 | 1400 |
| 9:00 AM | 2070 | 0 | 0 | 0 | 0 | 0 | 1890 |
| 10:00 AM | 2640 | 0 | 0 | 0 | 0 | 0 | 2640 |
| 11:00 AM | 2730 | 0 | 0 | 0 | 0 | 0 | 2990 |
| 12:00 PM | 2800 | 0 | 0 | 0 | 0 | 0 | 3360 |
| 1:00 PM | 2850 | 0 | 0 | 0 | 0 | 150 | 3750 |
| 2:00 PM | 2700 | 0 | 0 | 0 | 0 | 300 | 3900 |
| 3:00 PM | 2380 | 0 | 0 | 0 | 0 | 420 | 3780 |
| 4:00 PM | 2080 | 0 | 0 | 0 | 0 | 520 | 3640 |
| 5:00 PM | 1800 | 0 | 0 | 0 | 0 | 600 | 3480 |
| 6:00 PM | 1400 | 0 | 0 | 0 | 100 | 600 | 3000 |
| 7:00 PM | 1170 | 0 | 0 | 0 | 180 | 630 | 2790 |
| 8:00 PM | 960 | 0 | 0 | 0 | 240 | 640 | 2560 |
| 9:00 PM | 770 | 0 | 0 | 0 | 280 | 630 | 2310 |
| 10:00 PM | 500 | 50 | 50 | 50 | 250 | 500 | 1675 | on campus and walk to class. At night, this percentage might drop to 25%. Table 24 shows a simple matrix of student parking load factors.

TABLE 24

|  | Sunday | Monday | Tuesday | Wednesday | Thursday | Friday | Saturday |
|---|---|---|---|---|---|---|---|
| 7:00 AM |  | 25% | 25% | 25% | 25% | 25% | 50% |
| 8:00 AM |  | 25% | 25% | 25% | 25% | 25% | 50% |
| 9:00 AM |  | 25% | 25% | 25% | 25% | 25% | 50% |
| 10:00 AM |  | 25% | 25% | 25% | 25% | 25% | 50% |
| 11:00 AM |  | 25% | 25% | 25% | 25% | 25% | 50% |
| 12:00 PM |  | 25% | 25% | 25% | 25% | 25% | 50% |
| 1:00 PM |  | 40% | 40% | 40% | 40% | 40% | 50% |
| 2:00 PM |  | 40% | 40% | 40% | 40% | 40% | 50% |
| 3:00 PM |  | 40% | 40% | 40% | 40% | 40% | 50% |
| 4:00 PM |  | 40% | 40% | 40% | 40% | 40% | 50% |
| 5:00 PM |  | 40% | 40% | 40% | 40% | 40% | 50% |
| 6:00 PM |  | 50% | 50% | 50% | 50% |  |  |
| 7:00 PM |  | 75% | 75% | 75% | 75% |  |  |
| 8:00 PM |  | 75% | 75% | 75% | 75% |  |  |
| 9:00 PM |  | 75% | 75% | 75% | 75% |  |  |
| 10:00 PM |  | 75% | 75% | 75% | 75% |  |  |

After the academic parking load matrix is determined, the institution should discern the parking needs of the people attending non-academic activities and of the staff. First, the institution should study the historic event scheduling loads during various times of the day in the various buildings on campus. Then, they should multiply this event load by an event parking load factor by time of day (similar to Table 24). Finally, the event data should be merged with the staff parking needs by the building in which they are held or housed, respectively. For example, a historical event load of 200 people—half of whom must drive to campus and park—merged with a staff load of 500 in a building at 11:00 am on Mondays would yield a total (non-academic) load of 600 for that hour. A simplified sample of non-academic parking load (assuming one parking lot for the entire campus) is shown in Table 25.

TABLE 25

|  | Sunday | Monday | Tuesday | Wednesday | Thursday | Friday | Saturday |
|---|---|---|---|---|---|---|---|
| 7:00 AM |  | 150 | 150 | 150 | 150 | 150 | 150 |
| 8:00 AM |  | 400 | 400 | 400 | 400 | 400 | 200 |
| 9:00 AM |  | 550 | 550 | 550 | 550 | 550 | 200 |
| 10:00 AM |  | 550 | 550 | 550 | 550 | 550 | 200 |
| 11:00 AM |  | 600 | 600 | 600 | 600 | 600 | 200 |
| 12:00 PM |  | 600 | 600 | 600 | 600 | 600 | 200 |
| 1:00 PM |  | 600 | 600 | 600 | 600 | 600 | 200 |
| 2:00 PM |  | 600 | 600 | 600 | 600 | 400 | 200 |
| 3:00 PM |  | 600 | 600 | 600 | 600 | 300 | 200 |
| 4:00 PM |  | 500 | 500 | 500 | 500 | 200 | 200 |
| 5:00 PM |  | 200 | 200 | 200 | 200 | 150 | 200 |
| 6:00 PM |  | 100 | 100 | 100 | 100 |  |  |
| 7:00 PM |  | 300 | 300 | 300 | 300 |  |  |
| 8:00 PM |  | 400 | 400 | 400 | 400 |  |  |
| 9:00 PM |  | 300 | 300 | 300 | 300 |  |  |
| 10:00 PM |  | 100 | 100 | 100 | 100 |  |  |

Typically, the parking load shown in Table 25 would need to be determined by building and then distributed to the various parking lots on a campus through a distribution table, as shown in Table 26. This step serves to prevent someone from walking 25 minutes from a parking spot to a class, event or their office. Additionally, the distribution table shown in Table 26 can serve as an additional factor in the timetabling algorithm in so much as it is more preferable to have immediate access to parking than to have a relatively long walk. Therefore, a time slot and room assignment that has parking availability in that building's primary lot should be considered more desirable in the timetabling algorithm than a time slot and room that only has access to a secondary lot.

TABLE 26

|  | LOT A | LOT B | LOT C | LOT D |
|---|---|---|---|---|
| Building 1 | 50% | 0% | 30% | 20% |
| Building 2 | 40% | 0% | 60% | 0% |
| Building 3 | 0% | 100% | 0% | 0% |
| Building 4 | 0% | 0% | 30% | 70% |

The resulting parking availability from Tables 25 and 26 should be considered a constraint in the timetabling (academic) and event scheduling (non-academic) processes. For example, if the parking lot for the hypothetical campus in Table 25 has 1,000 stalls, there would only be an estimated 400 stalls available for academic scheduling during some of that campus' primetime hours in the middle of the week. The timetabling algorithm should automatically avoid overbooking parking during peak scheduling times, unless there is a provision for slightly overbooking spaces and allowing for no-shows.

Many students take two or more classes in different buildings on the same day. These students will typically park near the building where first class is held, and then walk to subsequent classes. Despite this phenomenon, it is not recommended that the parking availability calculations factor parking load on a student-specific basis. It is impossible to predict where a student who attends classes in multiple buildings in the same day will park. Attempting to do so and adjusting parking loads accordingly would make the calculations needlessly complicated. Instead, academic parking load should simply be calculated as the number of students attending classes in a building for any hour of the week.

While timetabling algorithms have never specifically been designed to consider parking availability, similar constraint-based algorithms have been developed and are part of the prior art in this area.

An approach that places a higher priority on academic activities is to limit the "reserved" stalls for event activities to only significant institution event users, leaving the remaining events to find times where parking is available (in addition to desirable space). To accomplish this, the event scheduling module should be able to identify and avoid time periods and buildings where parking is already full allocated.

Finally, the system should be able to analyze the financial impact of renting spaces to students or event attendees and of paying for additional parking at certain times during the week. If a large event or a new course offering during certain parts of the week require additional parking, the system should be able to assess the revenue from the event or students (if they are charged for parking) against the costs of the event or classes (from renting the additional parking). Since the financial impact calculations are relatively simple (additional revenue less additional expense), they can be done through reports or in a spreadsheet (and don't need to be dynamically integrated into scheduling software).

The approach of capacity bottleneck optimization factors the following issues into Timetable development automatically: enrollment growth projections and goals, bottleneck identification through scheduling load analysis by room type and time for academic activities, identification of academic activities scheduled in the bottleneck, identification of the quantity of bottleneck activities that need to be moved in order to achieve projected or desired enrollment growth, and prioritization of bottleneck activities that must be moved to a new time slot or room. Capacity bottleneck optimization should be done in Step 2-E (FIG. 2) or 4-D (FIG. 4), along with time changes to accommodate student need.

Existing and future enrollment levels should be determined based on Demand Analysis outlined in the first component of the invention. Based on anticipated enrollment, the required Course Sections should be included in academic schedules as outlined in the second component of the invention.

Next, all Course Sections should be pre-assigned to rooms or given room type and room feature preferences so that activities may be given appropriate room assignments. This step is best accomplished using room scheduling software available in the prior art.

Prior to attempting to assign Course Sections to rooms, a load analysis by room type and time should occur. The recommended approach is an enhancement to the room assignment algorithm of a typical room scheduling software application that a) identifies bottleneck rooms and b) isolates those activities that are scheduled into bottleneck rooms. It is recommended that this step be automatically run by a timed process that provides a current bottleneck list to those involved in the Timetable development process in a dashboard format. Examples of bottleneck activities, for the Master Schedule and Lock Step approach, are given in the invention summary. Table 27 shows a simple Master Schedule Approach illustration of large classroom bottlenecks.

TABLE 27

| | Activities needing large classrooms (current inventory is 10 large classrooms) | | | | | | |
|---|---|---|---|---|---|---|---|
| | Sunday | Monday | Tuesday | Wednesday | Thursday | Friday | Saturday |
| 7:00 AM | 0 | 0 | 0 | 0 | 0 | 0 | 0 |
| 8:00 AM | 0 | 1 | 1 | 1 | 1 | 1 | 0 |
| 9:00 AM | 0 | 2 | 2 | 2 | 2 | 1 | 0 |
| 10:00 AM | 0 | 7 | 5 | 7 | 5 | 7 | 0 |
| 11:00 AM | 0 | 15 | 10 | 15 | 3 | 9 | 0 |
| 12:00 PM | 0 | 12 | 10 | 12 | 3 | 10 | 1 |
| 1:00 PM | 0 | 7 | 6 | 0 | 0 | 7 | 1 |
| 2:00 PM | 0 | 3 | 0 | 0 | 0 | 0 | 0 |
| 3:00 PM | 0 | 0 | 0 | 0 | 0 | 0 | 0 |
| 4:00 PM | 0 | 0 | 0 | 0 | 1 | 0 | 0 |
| 5:00 PM | 0 | 0 | 1 | 1 | 1 | 0 | 0 |
| 6:00 PM | 0 | 0 | 0 | 1 | 1 | 0 | 0 |
| 7:00 PM | 0 | 2 | 0 | 1 | 0 | 0 | 0 |
| 8:00 PM | 0 | 2 | 2 | 0 | 0 | 0 | 0 |
| 9:00 PM | 0 | 2 | 2 | 0 | 0 | 0 | 0 |

Based on the example shown in Table 27, either activities in the 11:00 am and 12:00 pm time slots on Monday and Wednesday need to be moved or additional large classrooms need to be added to the room inventory. If no additional rooms are added, 5 activities must be moved in the 11:00 am slots and 2 activities must be moved in the 12:00 pm slots. A combination of the peak usage analysis shown in Table 27 and average utilization by room type, shown in Table 28 should be made regularly to isolate changes in the room inventory to facilitate enrollment growth. The effective capacity of a campus can not be expanded and enrollments can't grow through the addition of non-bottleneck space to the room inventory. "Room Hrs. Utilization," listed below, is the best measure of overall scheduling load by type of room. In the example below, rooms in the "IT Lab-CAD" room type are the most pronounced bottleneck. The two rooms of that type are in use, on average, 85.33% of the scheduling week (which is calculated by dividing the hours that the rooms are in use—68—by the total hours that the rooms are available: 40 (hours per week)×2 (rooms), or 80 (available room hours).

TABLE 28

Space Utilization by RoomType

| Room Type | Count | % of Total | Sq. Ft. | % of Total | Sum | Room Hrs. Utilization | % of Total |
|---|---|---|---|---|---|---|---|
| Classroom | 32 | 44.44% | 26,270 | 39.65% | 748 | 58.42% | 50.60% |
| Darkroom | 1 | 1.39% | 160 | 0.24% | 11 | 26.67% | 0.72% |
| I T Lab -CAD | 2 | 2.78% | 2,800 | 4.23% | 68 | 85.33% | 4.62% |
| I T Lab -MAC | 4 | 5.56% | 5,076 | 7.66% | 120 | 75.00% | 8.12% |
| I T Lab -PC | 9 | 12.50% | 10,224 | 15.43% | 242 | 67.11% | 16.35% |
| Kitchen | 1 | 1.39% | 300 | 0.45% | 3 | 8.00% | 0.22% |
| Special Lab-AET | 2 | 2.78% | 2,700 | 4.08% | 34 | 42.00% | 2.27% |
| Special Lab-ASL | 1 | 1.39% | 835 | 1.26% | 27 | 66.67% | 1.80% |
| Special Lab-Care | 1 | 1.39% | 1,200 | 1.81% | 9 | 21.33% | 0.58% |
| Special Lab-Edit | 2 | 2.78% | 760 | 1.15% | 10 | 12.00% | 0.65% |
| Total: | 72 | | 67,210 | | 1,478 | 51.31% | |

There are various acceptable criteria for prioritizing which of the bottleneck activities should be moved. As mentioned in the Summary section, the possible criteria for these moves are: balancing allocation of bottleneck resources by department or academic subject, student and/or instructor time of day availability during alternative timeslots, alternative room availability, etc.

The simplest approach is alternative room availability. If enough of the bottleneck activities can be scheduled into other types of rooms, then assignment rules should be relaxed for those activities so that all activities can be placed.

Balancing allocation by department or subject involves an analysis of the percentage of the Course Sections of each of the department or subject that are in the bottleneck. Table 29 illustrates such an analysis for the 15 Course Sections in Table 27 that are scheduled in the 11:00 am bottleneck on Monday. In this case, all subjects are allowed to have only 10% of their Course Sections scheduled in the bottleneck so that 5 activities can be moved.

TABLE 29

| Subject | Bottleneck Course Sections | Total Course Sections | % of Course Sections in Bottleneck | Course Sections to be moved |
|---|---|---|---|---|
| BIOL | 4 | 20 | 20% | 2 |
| ENGL | 5 | 50 | 10% | 0 |
| PSYC | 4 | 20 | 20% | 2 |
| POLI | 2 | 10 | 40% | 1 |
| TOTALS | 15 | | | 5 |

The final method is recommended for institutions that implement the student-specific course demand analysis and application of demand data components of the invention. Using the Course/Time/Day and Joint Demand Analysis, the institution can search for alternate time slots for the Course Sections in the bottleneck. The Course Sections with the lowest weighted assignment costs associated with available time slots should be moved from the bottleneck so as to minimize the impact on students. Formulae for Course/Time/Day and Joint Demand Analysis are listed in the respective sections of the preferred embodiment of the invention, above.

The Timetable development business processes and the technical design of the scheduling software must facilitate full Student Information System integration. The primary objectives of integration are preservation of data integrity and improved work flow between the systems.

Student Information System Integration is critical to the processes shown in FIG. 2 and FIG. 4. In most cases, data must be passed between the SIS and the scheduling system continually during the Timetable development process. In all cases, room and time assignment must be updated in the SIS prior to student registration for the academic term being developed.

Preservation of data integrity must be accomplished through the elimination of the "copy" of the data from the SIS within the scheduling software. The process and design considerations are: identification of time-sensitive scheduling operations, identification of the shared data elements updated during those time-sensitive operations, designing the scheduling software such that it can access such data elements dynamically from the SIS, creating automated batch processes to update all other data regularly (for reporting, etc.). Technically, these considerations can be met by using a variety of development tools and protocols. The essential result is a system that can access data from two sources (at the database layer) and merge it together so that the business logic (business logic layer) receives required information in an expected/supported format.

Improved workflow must be accomplished by embedding of frequently used controls from the scheduling system into the SIS user interface. The process and design considerations are: identification of frequently used controls, and creating application programming interfaces (APIs) that support the deployment of such controls in remote Student Information Systems. Technically, these considerations can be met by using a variety of development tools and protocols. The essential result is a system that can pass and retrieve parameters from various user interfaces (presentation layer) and merge it together so that the business logic (business logic layer) receives required information in an expected/supported format.

FIG. 6 shows a simple schematic of a system that supports the recommended integration.

What is claimed and desired to be secured by Letters Patent is as follows:

1. A method of programming a general purpose computer to provide a special purpose computer to determine and schedule student demand for courses for a population of students for a future school term comprising:
   programming a general purpose computer to receive and store a student data component for an at least one previous academic term,
   programming said computer to receive and store a course schedule data component for an at least one previous academic term,
   programming said computer to determine a future student course demand for each of an at least two courses of said course schedule data component to provide a course quantitative demand for each of said at least two courses, programming said computer to determine a joint demand for an at least one pair of courses from said course quantitative demand, programming said computer to identify an at least one student sub-population quantity of said student data component, programming said computer to analyze said course quantitative demand and said joint demand by said at least one student sub-population quantity to provide a student sub-population demand, programming said computer to receive and store a set of future students available for a time period to be scheduled in a future academic term to provide a set of available students, programming said computer to apply said student sub-population demand to said set of available students to identify a student sub-population demand of available students for at least one pair of courses;

programming said computer to provide a tentative course section demand for a future academic term, and programming said computer to subdivide said course quantitative demand to determine a course section quantitative demand for said tentative future academic term by cross-referencing said future student time availability with tentative offering times of course sections in said tentative future course schedule data component to derive a tentative course section demand for a said at least one future academic term.

2. A method of programming a general purpose computer to provide a special purpose computer to determine and schedule student demand for classes of a program of study comprising:

programming a general purpose computer to receive and store a set of course requirements for a program of study, programming said computer to receive and store a set of completed courses for a set of all active students in said program of study, programming said computer to determine from said a set of course requirements and said set of completed courses a set of courses needed to fulfill program requirements for all active students in said program, programming said computer to eliminate from said set of courses needed for each student in said program any course that a student is not eligible to take to present a set of qualified courses, programming said computer to determine a quantitative demand for said set of qualified courses, programming said computer to determine a joint demand for said set of qualified courses, and programming said computer to subdivide said quantitative demand to determine a course section quantitative demand for said tentative future academic term by cross-referencing said future student time availability with tentative offering times of course sections in said tentative future course schedule data component to derive a tentative course section demand for a said at least one future academic term.

3. A method of programming a general purpose computer to provide a special purpose computer to determine academic course demand for a group comprising individuals for a set of courses comprising uniquely identified courses for a future academic term, the steps comprising:

a) programming a general purpose computer to receive and respond to a login onto an Internet-based survey by an individual intending to enroll for an at least one future academic term, b) programming said computer to present to said individual the set of courses for said at least one future academic term for which said individual is eligible to enroll, c) programming said computer to receive from said individual a selection of at least one course from said set of courses to provide a selected at least one course, d) programming said computer to receive at least one available time identified by said individual for said individual's attendance in said selected at least one course, e) programming said computer to associate said selected at least one course and said selected at least one available time to provide an individual course-time election, f) programming said computer to perform steps a-e by each individual of said group, g) programming said computer to combine each said individual course-time election into a data pool, h) programming said computer to separate by a unique course identity said course-time elections from said data pool to provide the quantity of unique course identity selections and set of selected times of student availability for unique course identity, and i) programming said computer to select at least one time to offer a unique course identity to take maximum advantage of the student available time.

* * * * *